United States Patent [19]
Perrott

[11] 3,780,666
[45] Dec. 25, 1973

[54] TRANSPORTATION

[76] Inventor: Francis Cyril Perrott, c/o The Manor House, South Cerney, Cirencester, Gloucestershire, England

[22] Filed: June 28, 1971

[21] Appl. No.: 157,102

[30] Foreign Application Priority Data
July 24, 1970 Great Britain.................. 36,010/70
Nov. 9, 1970 Great Britain.................. 53,099/70

[52] U.S. Cl.................... 104/88, 104/130, 104/105, 105/215, 104/141
[51] Int. Cl............................................ E01b 25/26
[58] Field of Search...................... 246/187 C, 63 R; 104/88, 96, 105, 130

[56] References Cited
UNITED STATES PATENTS
3,702,590   11/1972   Corby................................ 104/105
3,680,488   8/1972    Donlon.............................. 104/130

Primary Examiner—Gerald M. Forlenza
Assistant Examiner—D. W. Keen
Attorney—Young & Thompson

[57] ABSTRACT

Means of transportation comprise a track and vehicle guided along the track with the self-routing faculty of track selection. That is to say, two stationary guides are positioned at each branch of the track, and each vehicle carries means to select one or other of the guides and hence to follow one or other of the alternative routes at each track branch. For optimum track utilisation the vehicles, particularly at busy traffic periods, are grouped so that a plurality of vehicles run as a "contact train" with the individual vehicles in each group in contact one with the next. Although in contact they remain separate, so that at each branch any vehicle is free to follow the chosen or preprogrammed route at that branch.

21 Claims, 87 Drawing Figures

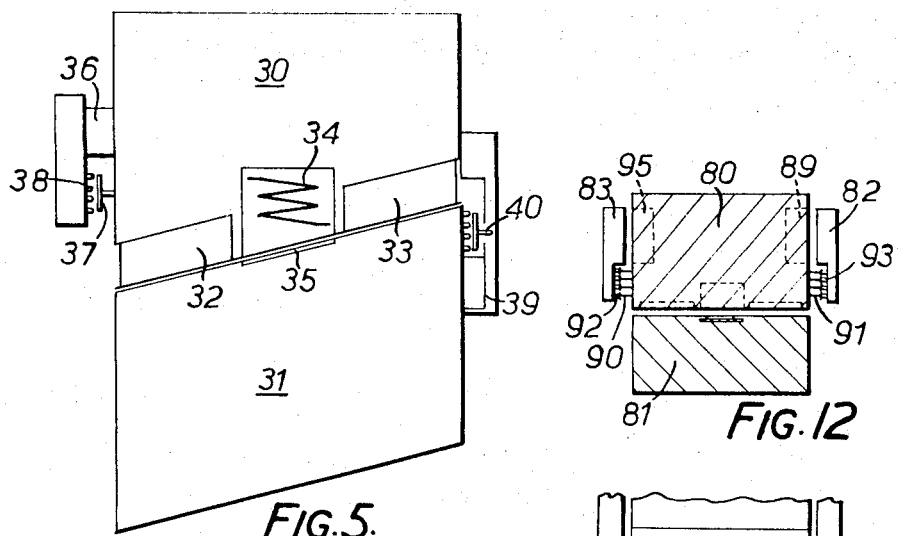
FIG. 5.
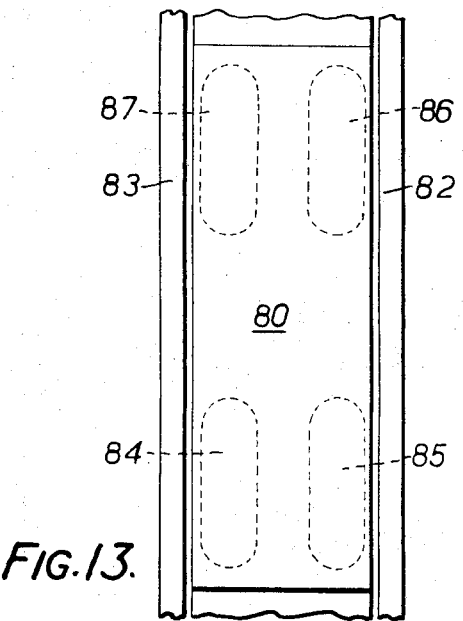
FIG. 12.
FIG. 13.
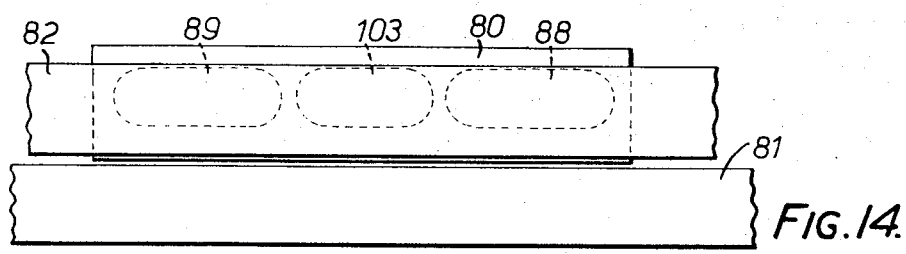
FIG. 14.

PATENTED DEC 25 1973 3,780,666

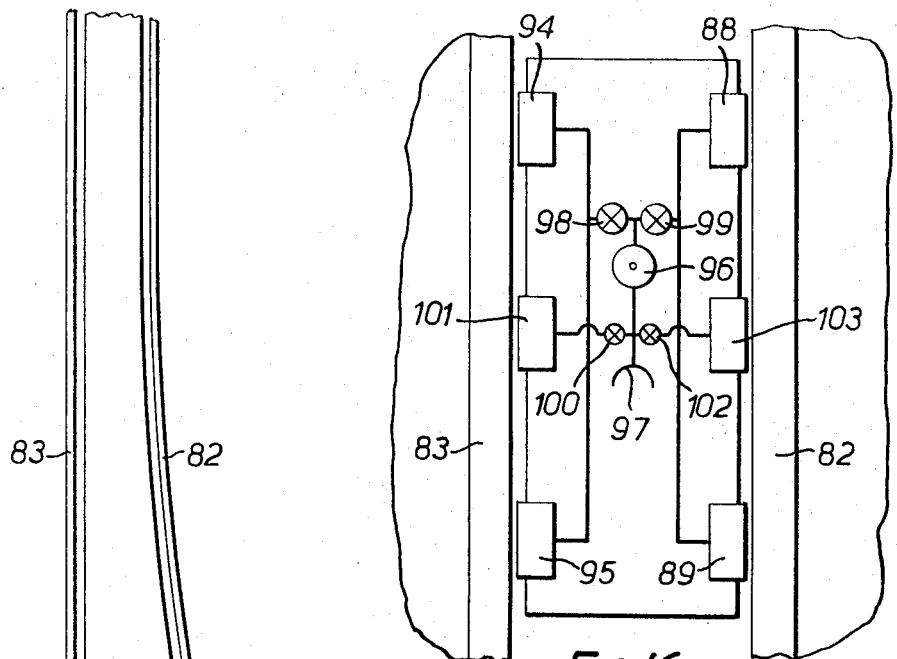
FIG. 16.
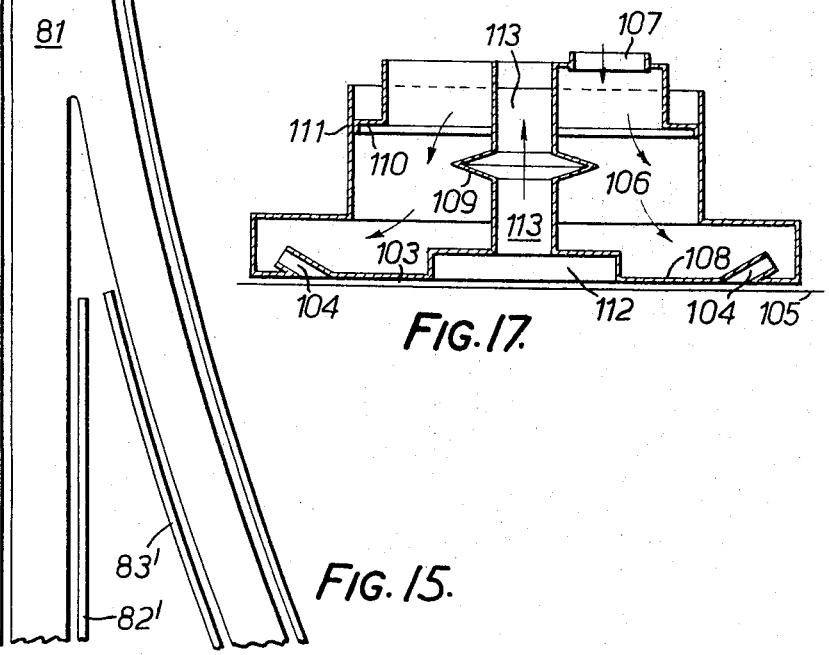
FIG. 17.
FIG. 15.

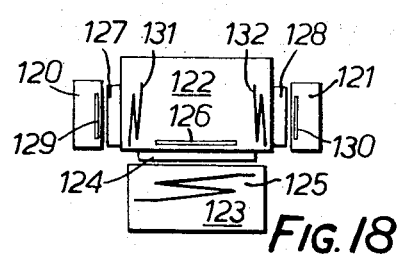
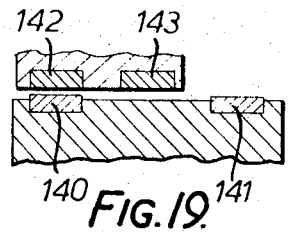
FIG. 18.    FIG. 19.
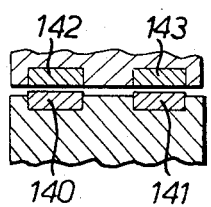
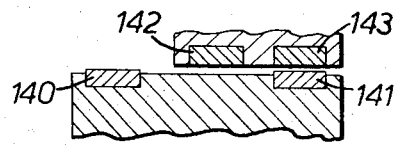
FIG. 20.    FIG. 21.
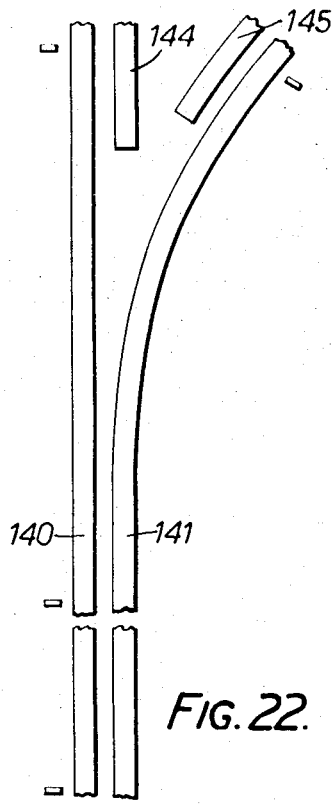
FIG. 22.

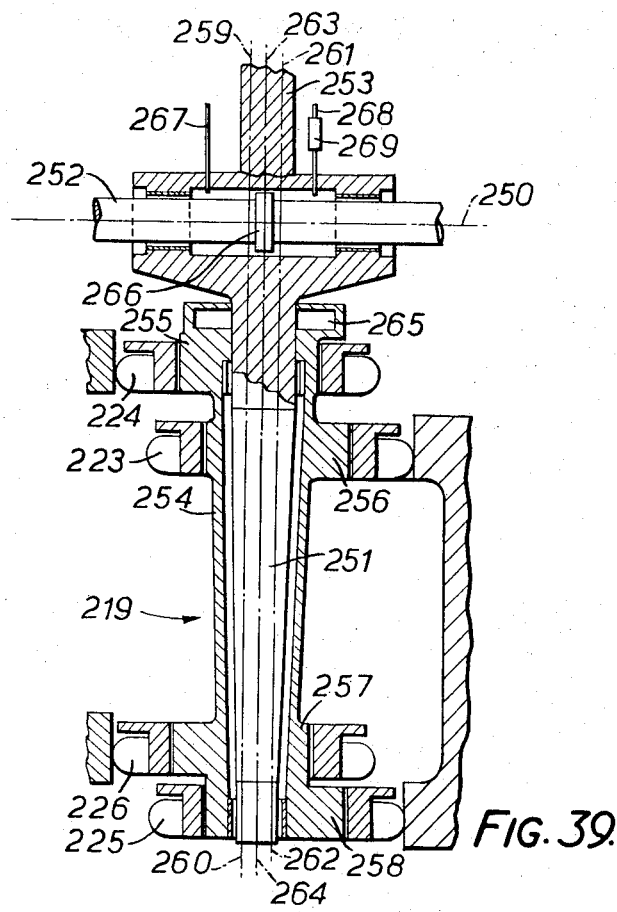
FIG. 39.
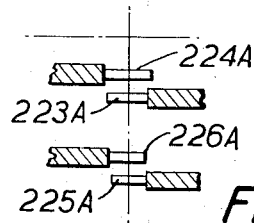
FIG. 40.  FIG. 41.
FIG. 42.

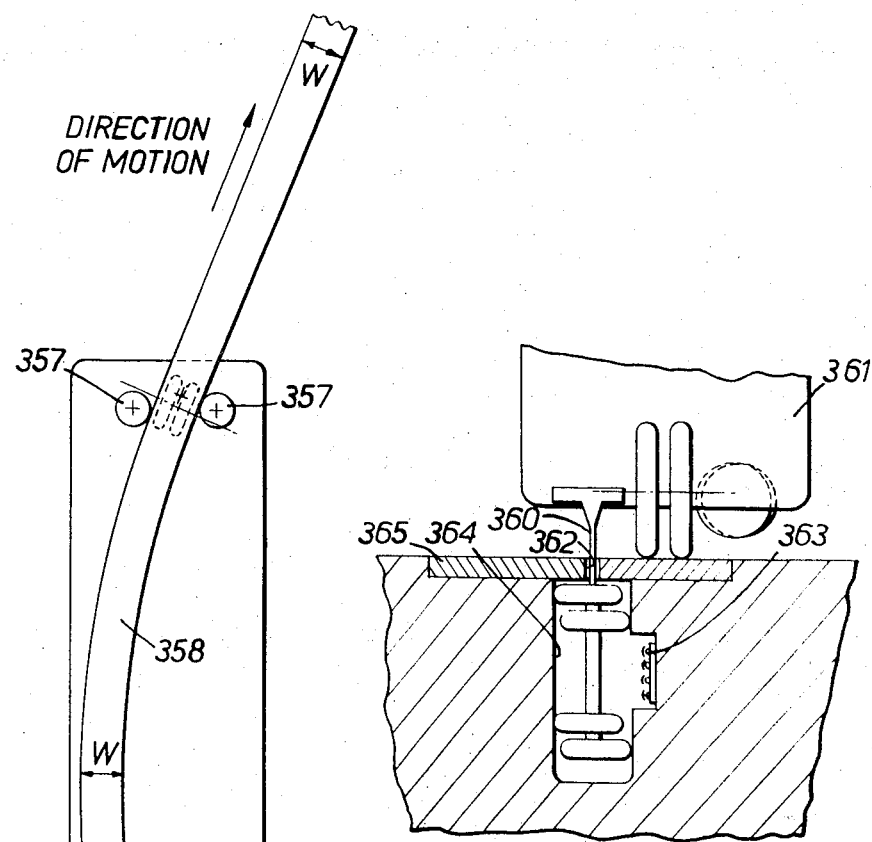
FIG. 48.
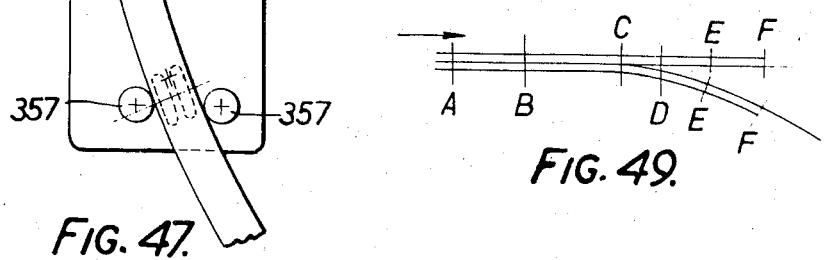
FIG. 47.
FIG. 49.

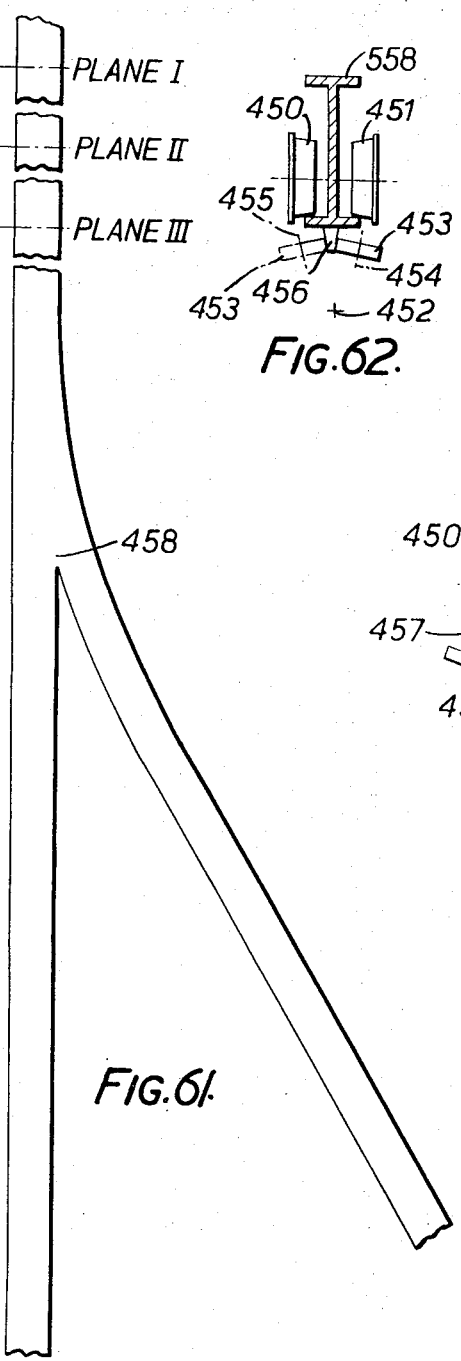
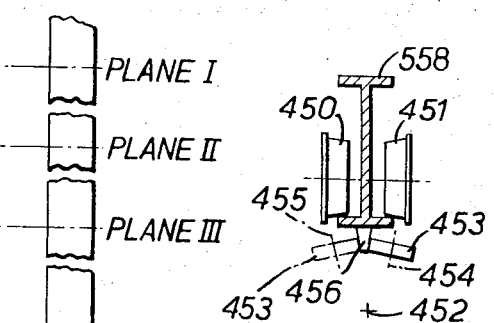
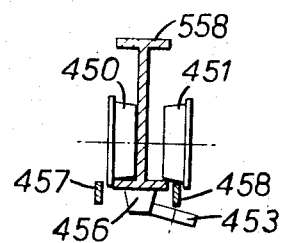
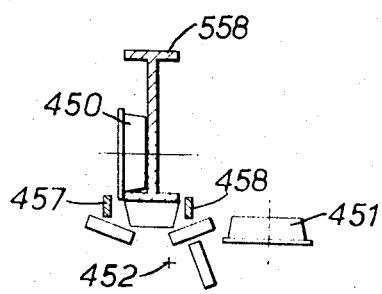
FIG.61.
FIG.62.
FIG.63.
FIG.64.

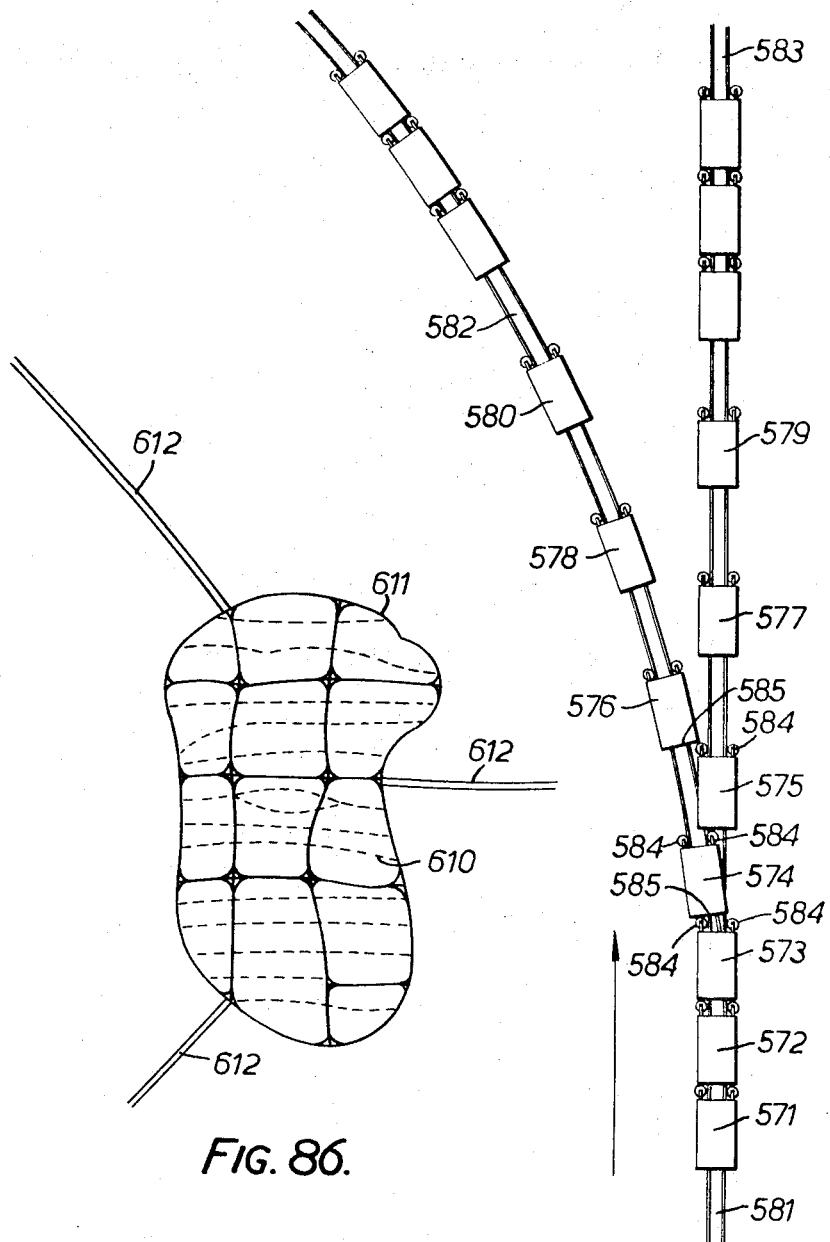

TRANSPORTATION

This invention relates to transportation, and in particular to means of transportation employing guided vehicles with self-routing faculty of track selection.

The term "guided vehicle" is used herein as referring to vehicles which are guided along a track on which they run. They are located transversely by direct forces applied to the vehicles by a stationary guide member or members, which members are provided by the rails in the case of a railway vehicle. The invention is not limited to railway tracks and vehicles, but it is advantageously applied to systems involving mono-rail tracks and vehicles.

Reference herein to "track selection" is to the routing concept employing two stationary guides at each branch of the vehicle track, one leading to the right and the other to the left, each vehicle carrying means to select which guide it will follow at the branch.

One object of the invention is to provide means of transportation, including guided vehicles and employing improved means of track selection. An additional, or alternative, object is to provide a transportation system with separate unit vehicles and providing increased track utilisation.

The invention will now be further described with reference to the accompanying drawings which illustrate, by way of example, various transportation systems, vehicular and track embodiments in accordance with the invention. In the drawings.

Figure 3:
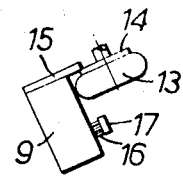
Figure 2:
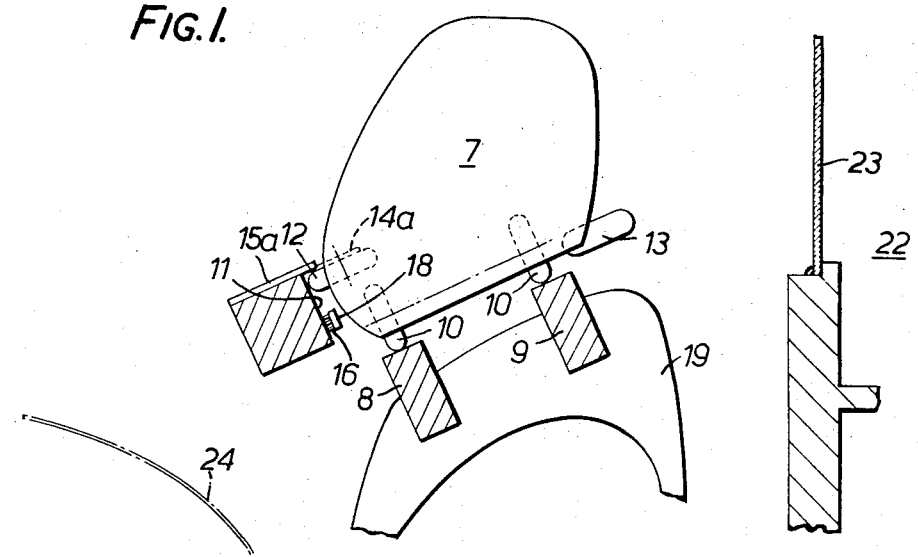
FIG. 2 is a similar view of another vehicle.
Figure 4:
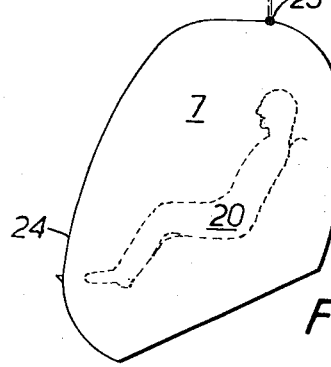
Figure 6:
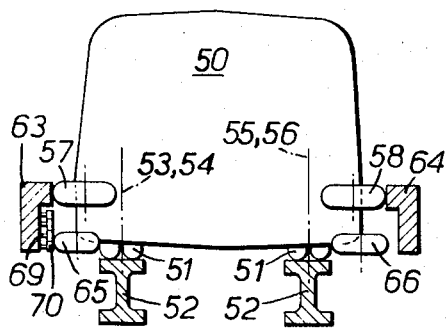
Figure 7:
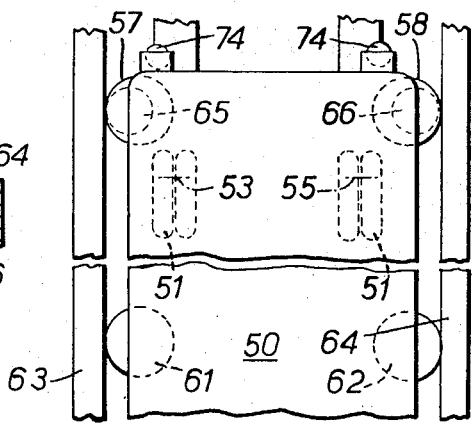
Figure 8:
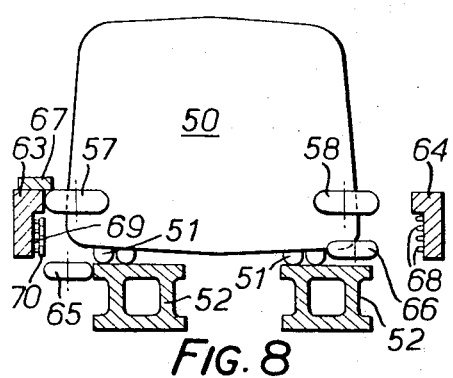
Figure 9:
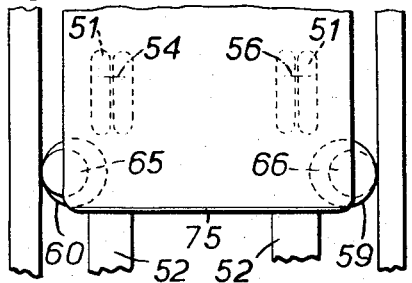
Figure 10:
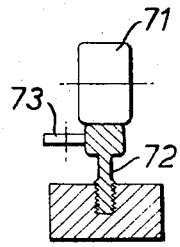
Figure 11:
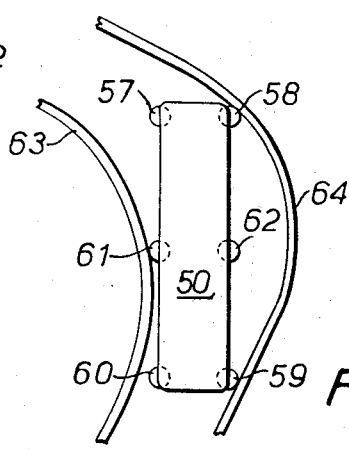
Figure 27:
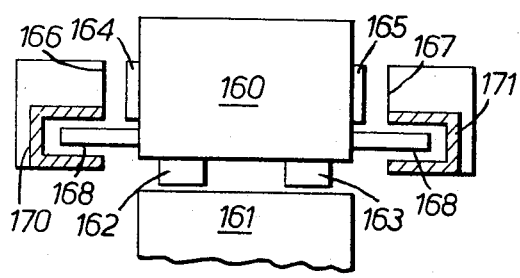
Figure 28:
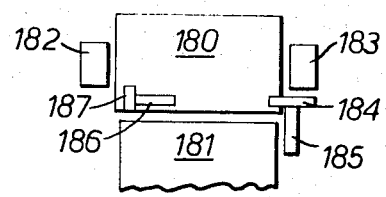
Figure 30:
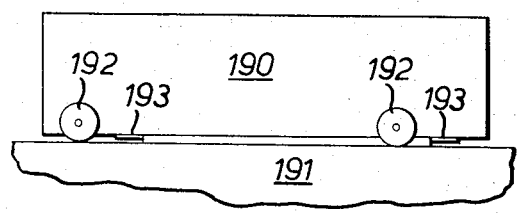
Figure 31:
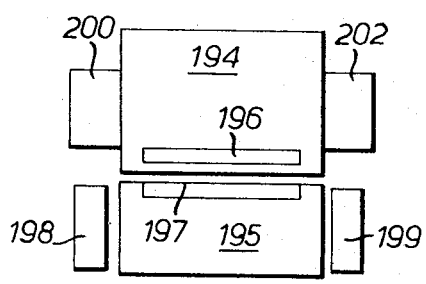
Figure 32:
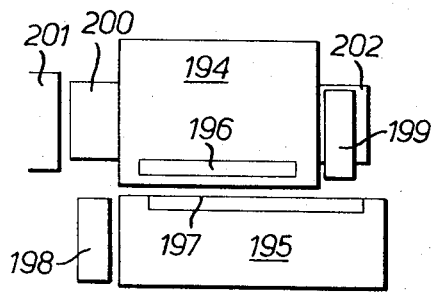
Figure 29:
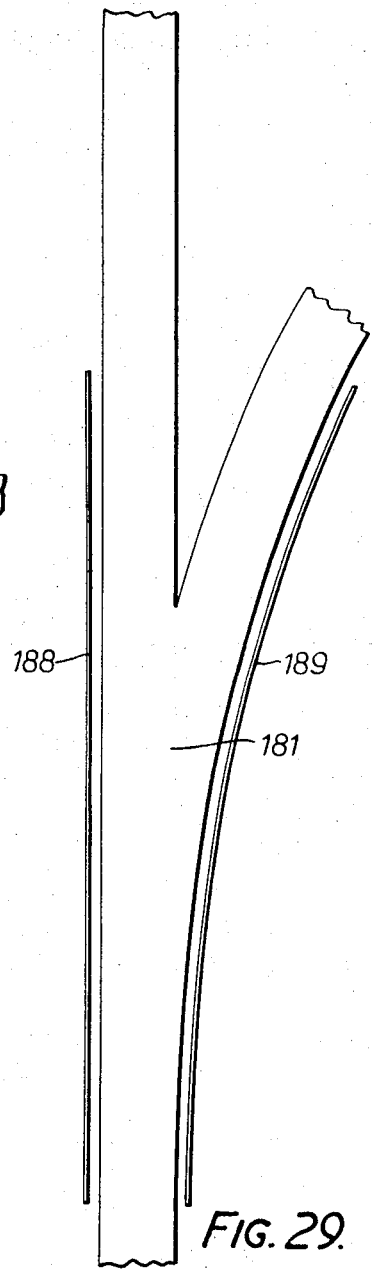
Figure 33:
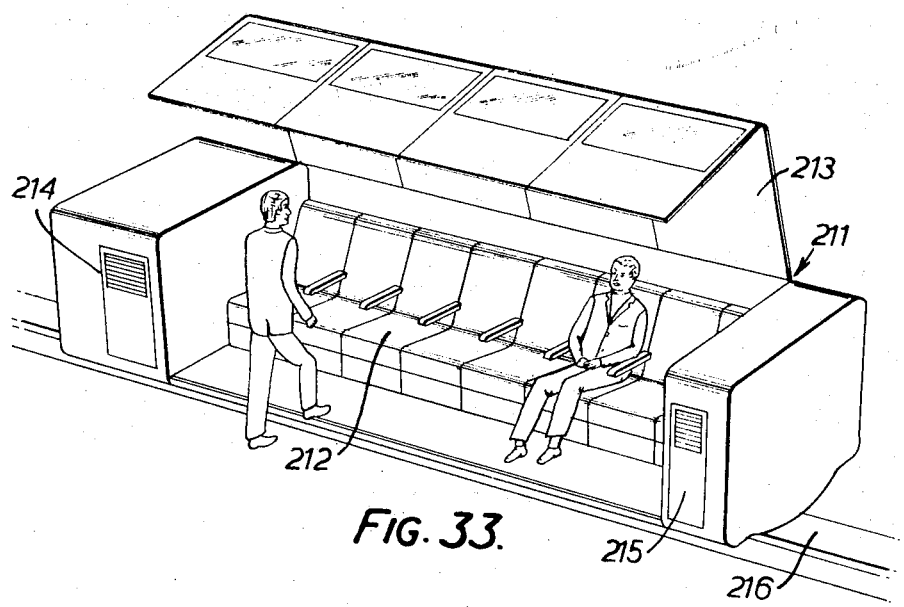
Figure 34:
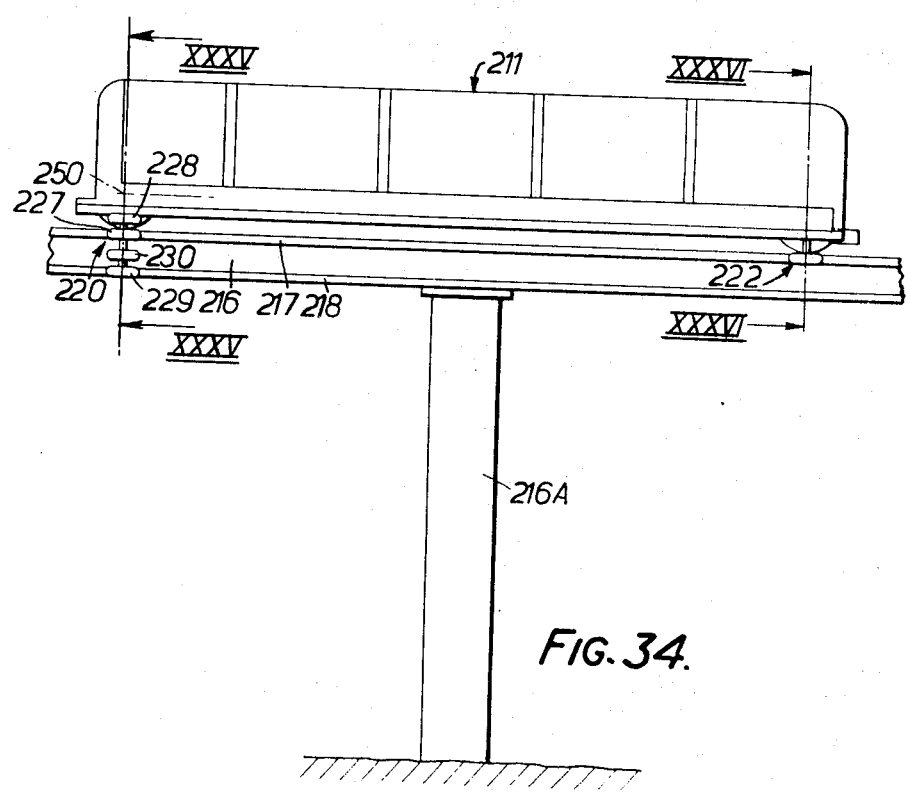
Figure 35:
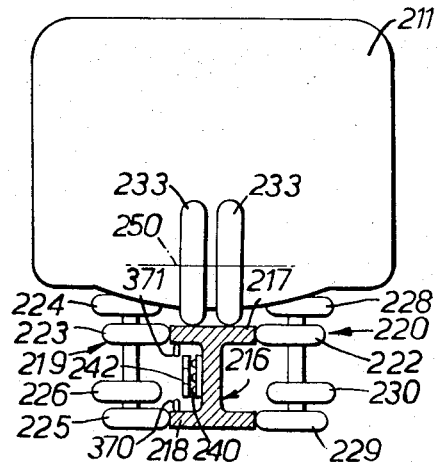
Figure 36:
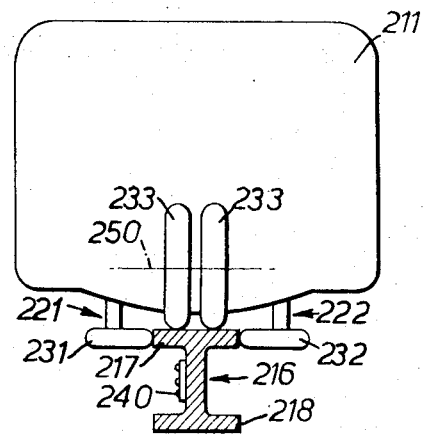
Figure 37:
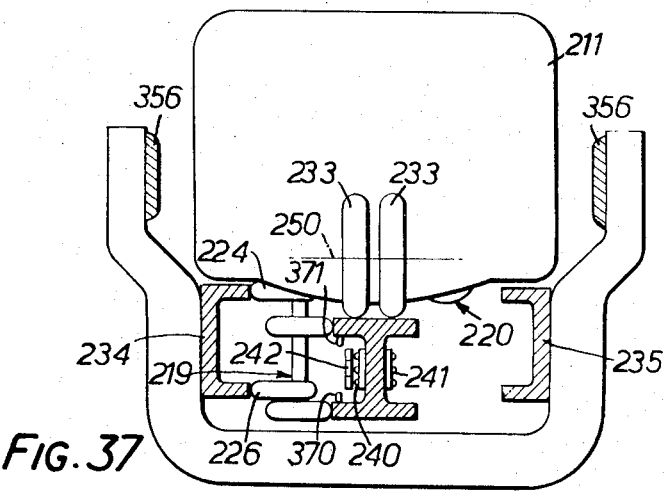
Figure 38:
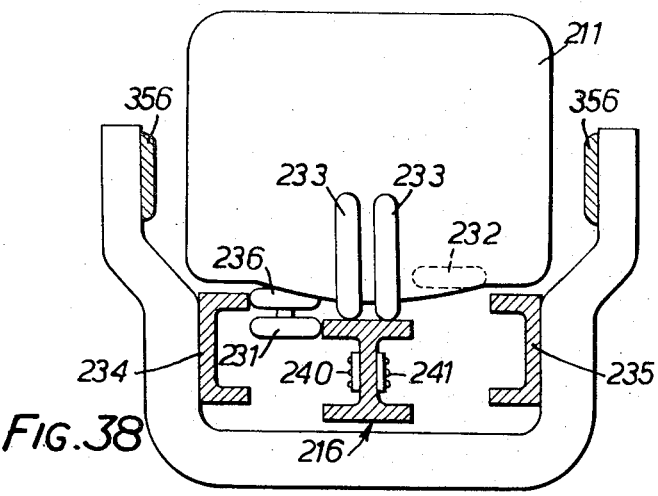
Figure 43:
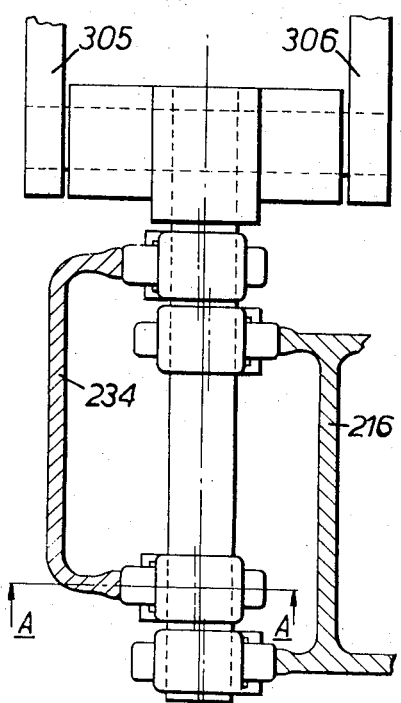
Figure 44:
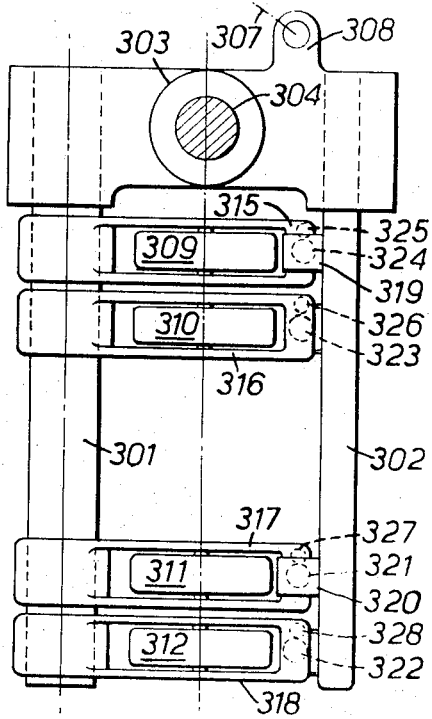
Figure 45:
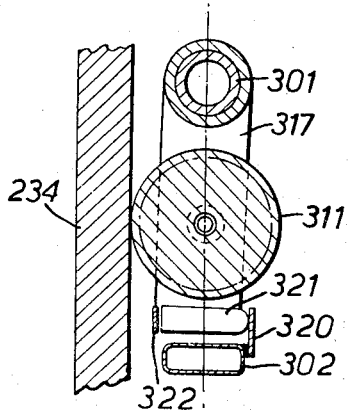
Figure 46:
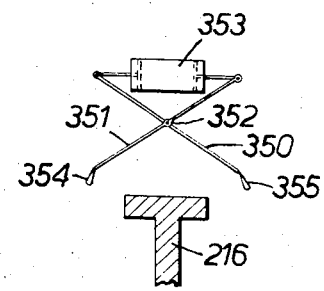
Figure 50:
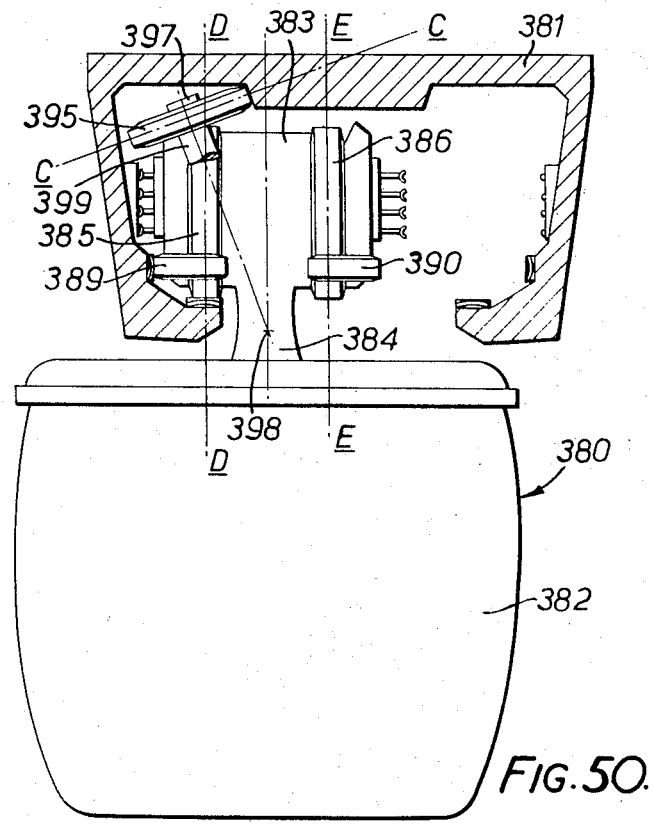
Figure 53:
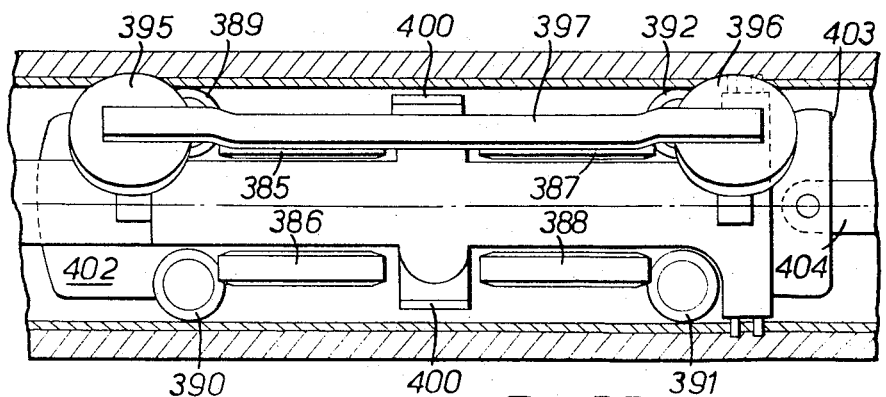
Figure 54:
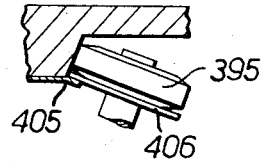
Figure 55:
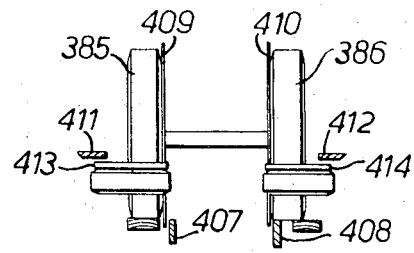
Figure 56:
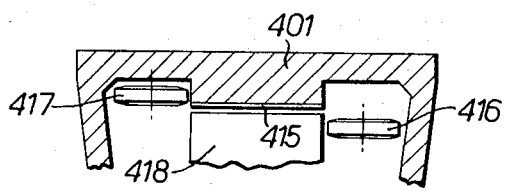
Figure 76:
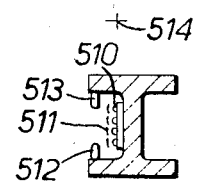
Figure 75:
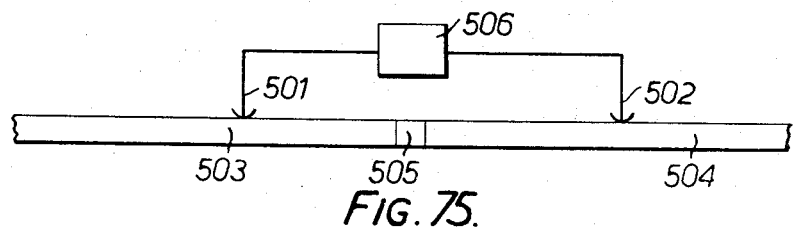
Figure 77:
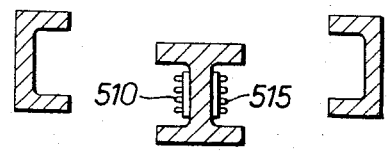
Figure 67:
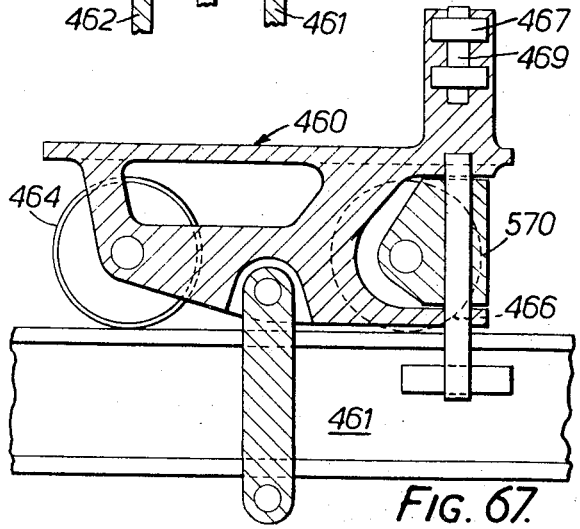
Figure 68:
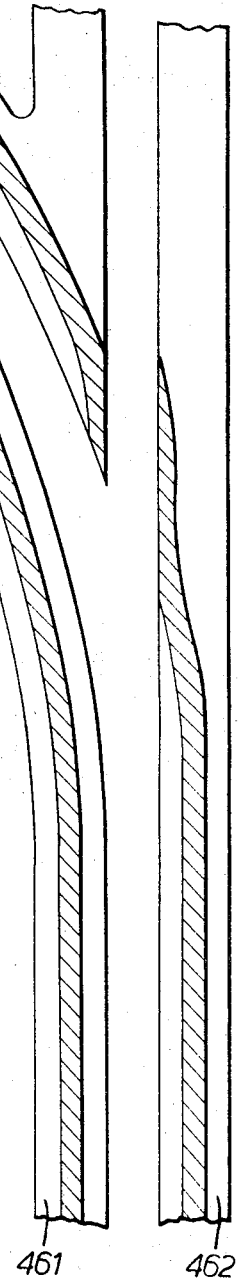
Figure 69:
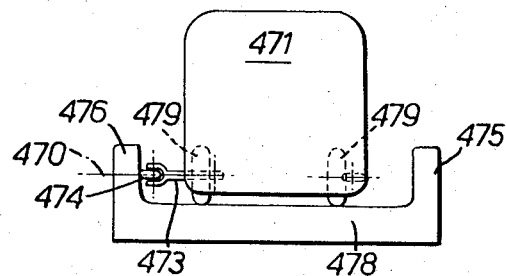
Figure 70:
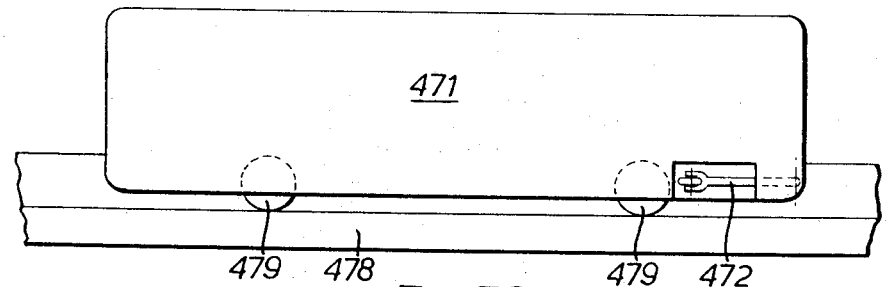
Figure 71:
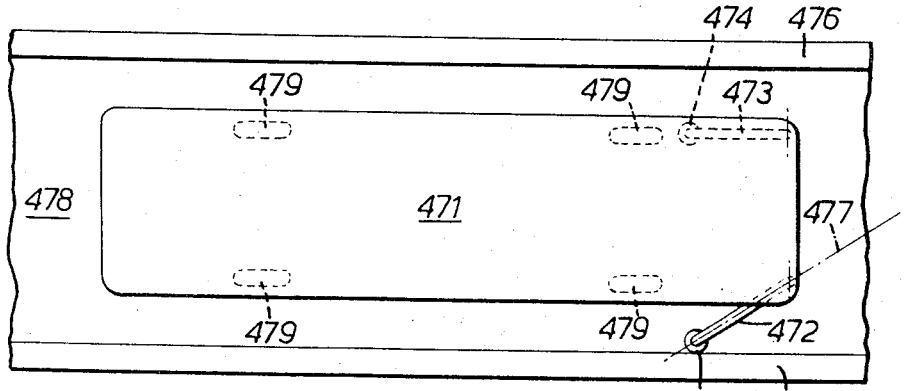
Figure 72:
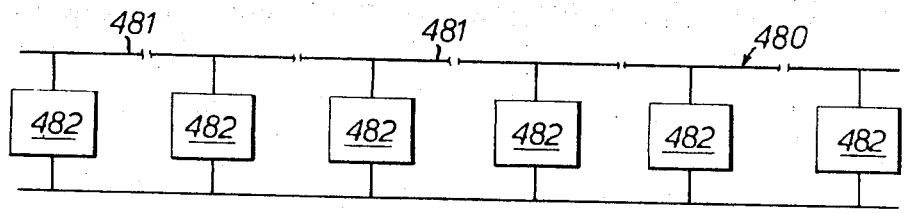
Figure 73:
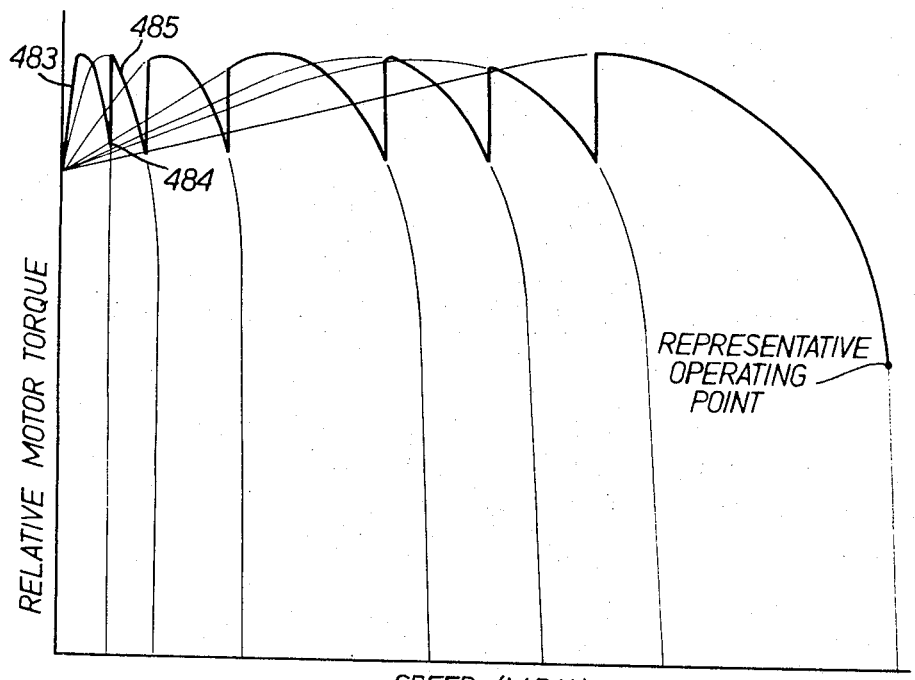
Figure 74:
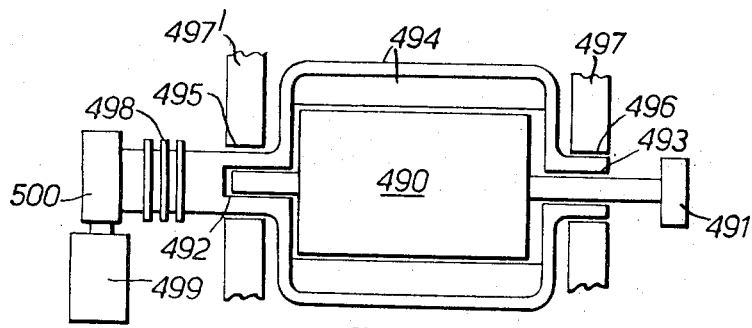
Figure 78:
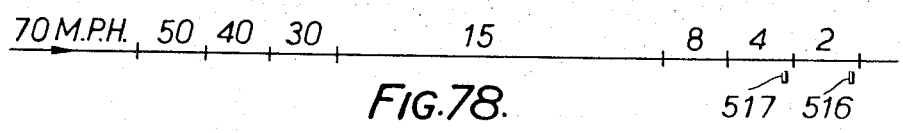
Figure 79:
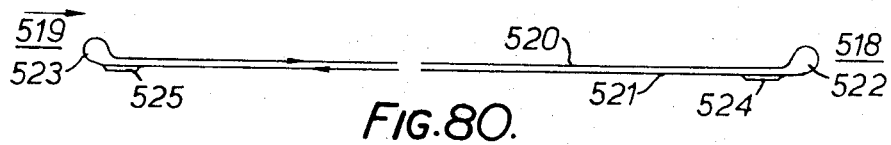
Figure 80:
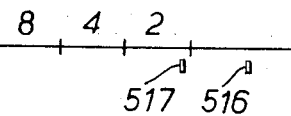
Figure 81:
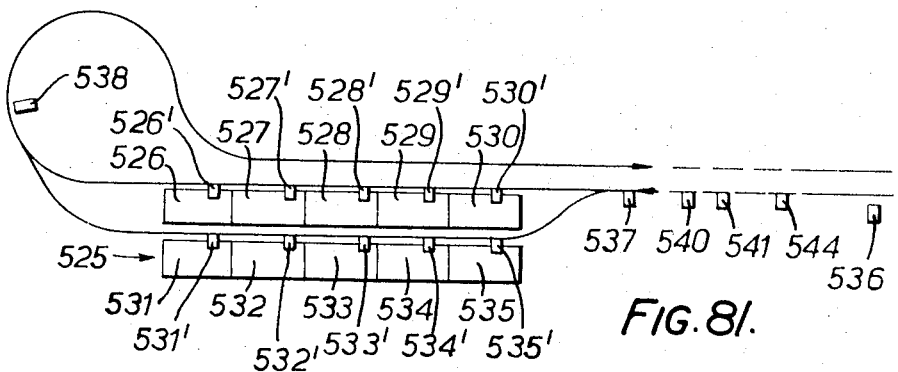
Figure 82:
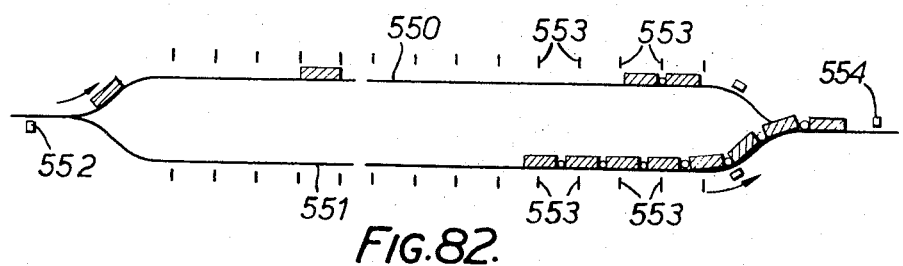
Figure 83:
Figure 85:
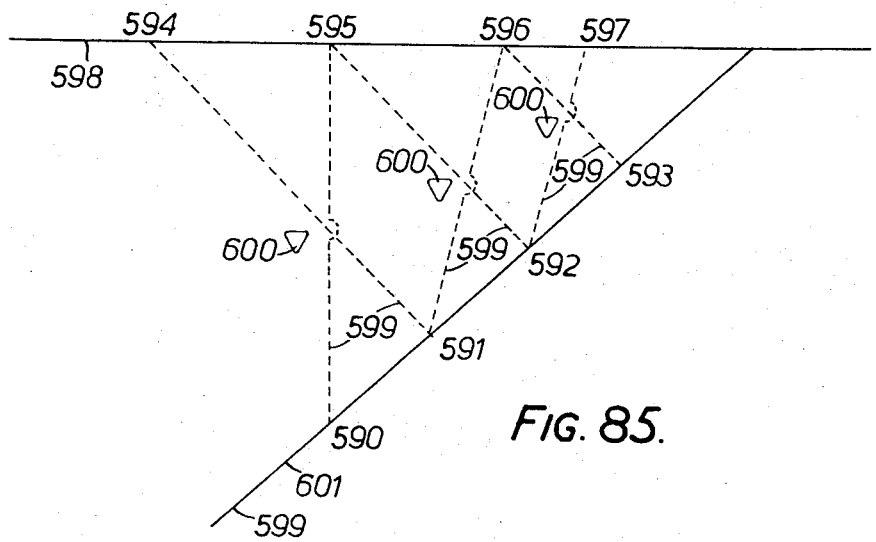
Figure 87:
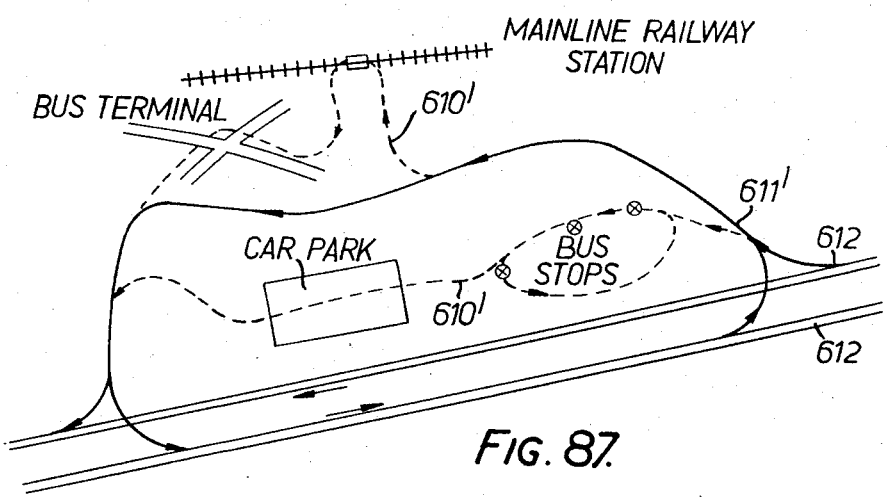

FIGS. 3 and 4 are respectively diagrammatic fragmentary sectional views of the embodiment of FIG. 2, FIG. 5 is a diagrammatic transverse sectional view of a modified vehicle and a track therefor, FIGS. 6 and 7 illustrate a further embodiment employing track selection, in end elevation and plan view respectively, FIG. 8 is a view similar to FIG. 6, illustrating a vehicle branching left, FIGS. 9 and 10 are detail views of this embodiment, FIG. 11 is a plan view showing the vehicle of FIGS. 6 to 10 travelling around a curve, FIGS. 12 to 15 illustrate another embodiment employing track selection, FIG. 16 is a plan view of specific parts of a vehicle of the embodiment shown in FIGS. 12 to 15, FIG. 17 is a sectional view of a detail assembly, FIG. 18 is a transverse sectional view of track and guide members of a further embodiment, FIGS. 19 to 21 illustrate further means of achieving track selection, FIG. 22 is a diagrammatic plan view of a track branch relating to the means of FIGS. 19 to 21, FIGS. 23 to 26 illustrate diagrammatically, and similarly to FIGS. 19 to 22, further means of achieving track selection, FIG. 27 illustrates another embodiment, FIG. 28 illustrates a further embodiment, FIG. 29 is a plan view of a branch in the track of the embodiment of FIG. 28, FIG. 30 illustrates the track and a vehicle of another embodiment, FIGS. 31 and 32 illustrate a further embodiment, FIG. 33 illustrates, diagrammatically and in perspective view, another vehicle embodiment, FIG. 34 is a diagrammatic side view of the vehicle of FIG. 33 on a corresponding mono-rail track, a non-branching track section being shown, FIGS. 35 and 36 are respectively sectional views on the lines XXXV — XXXV and XXXVI — XXXVI of FIG. 34, FIGS. 37 and 38 are similar views to FIGS. 35 and 36 so far as the section planes through the vehicle are concerned, but taken immediately before a track junction, FIG. 39 is a detail view of the same vehicle, FIGS. 40 and 41 are diagrams illustrating operating conditions relating to FIG. 39, FIG. 42 illustrates alternative detail of another embodiment, FIGS. 43 to 45 are further alternative detail views of a further embodiment, FIG. 46 illustrates braking means of a vehicle, FIG. 47 illustrates gauging of a curved section of track, FIG. 48 illustrates an embodiment particularly suitable for airport use, FIG. 49 illustrates control signalling arrangements in the region of a track branch, FIGS. 50 and 55 illustrate a suspended mono-rail embodiment, FIG. 56 illustrates the application of linear induction to propulsion of the vehicle of FIGS. 50 to 55, FIGS. 57 to 60 illustrate a further suspended mono-rail embdoiment, FIGS. 61 to 64 illustrate another suspended mono-rail embodiment, FIGS. 65 to 68 illustrate an embodiment in which a bogie rides above two separate track members, FIGS. 69 to 71 illustrate the application of track selection to a guided bus, FIGS. 72 to 73 illustrate diagrammatically proposals for speed control of vehicles, FIG. 74 illustrates associated speed trim means, FIG. 75 illustrates diagrammatically power supply means for driverless automatic vehicles, FIG. 76 shows a section through a track of an above-track mono-rail, FIG. 77 illustrates conditions in the vicinity of a branch or junction of the track of FIG. 76, FIGS. 78 and 79 respectively illustrate nominal control speeds for the same sections of track under different control conditions, FIG. 80 illustrates an initial track system, such as may be used to connect an urban centre with an airport, FIG. 81 illustrates a typical station of the system of FIG. 80, to an enlarged scale, FIG. 82 is a diagrammatic plan view of a station, FIG. 83 illustrates a track-obstruction detection system, FIG. 84 illustrates contact train vehicle separation at a track branch, FIG. 85 illustrates vehicle control arrangements at a track junction, FIG. 86 illustrates diagrammatically a typical urban distribution network, and FIG. 87 illustrates a secondary track of a network such as that of FIG. 86.

Figure 1:
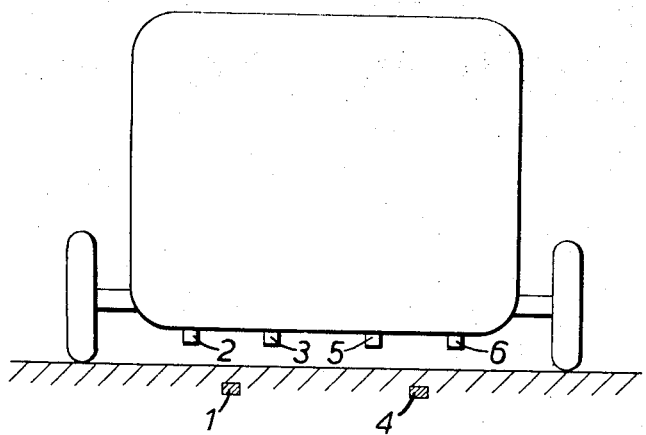
FIG. 1 is a diagrammatic transverse sectional view of a vehicle.

The vehicle embodiment of FIG. 1 incorporates the facility of track selection. A buried electrical conductor 1 is detected by vehicle-sensing members 2 and 3 and means are provided (not shown) whereby the vehicle is steered so as to maintain the conductor 1 centrally between the members 2 and 3 in plan view. At branches and junctions in the track an alternative buried conductor 4 and alternative vehicle-mounted sensing members 5 and 6 are provided. Thus if sensing members 2 and 3 are used the vehicle will follow the left-hand route of the conductor 1. If members 5 and 6 are used it will follow the right-hand route of the conductor 4. It is to be noted that the buried conductors 1 and 4 are not switched.

The vehicle of FIGS. 2 to 4 incorporates another embodiment of track selection. The vehicle 7 rides two inclined track members 8 and 9, being supported thereon on four wheels 10 (two visible in FIG. 2). It is transversely located against a guide surface 11 by reason of the inclination of the support track. Two follower wheels 12 spaced longitudinally of the vehicle engage said surface 11 and are not themselves articulated relative to the vehicle.

For branching right two right-hand follower wheels 13 are lowered to engage the right-hand side surface of the track member 9 as shown in FIG. 3. The vehicle then branches, the track surfaces remaining in one plane so that the right-hand branch will temporarily rise above the left-hand branch.

In order to stabilise the vehicle 7 against rolling to the left, the two guide wheels 13 may be fitted with safety discs 14 engageable with safety strips 15 as shown in FIG. 3. Similarly, in order to provide stability against rolling to the right, the left-hand wheels 10 and also wheels 12 (as shown) may be provided with safety discs and strips 14a, 15a. Such strips are temporarily discontinued as may be required for branching. Duplicated electricity distribution rails 16 are provided at branches of the track to ensure continuity of power supply to the vehicle. A power collector 17 is retractable for branching left. When branching right, a power collector 18 is withdrawn by reason of the transverse motion of the vehicle.

The vehicle track is supported by verticle frame members 19 and passengers may sit facing to one side as shown at 20 in FIG. 4. To the right of FIG. 2, 22 indicates the first floor of a residential building the windows such as 23 of which retain privacy since all passengers are facing in the opposite direction. A side and roof panel 24, hinged at 25, is movable to the open position shown in broken lines in FIG. 4 to provide a side opening through which passengers can enter and leave the vehicle.

FIG. 5 shows an adaptation of the last embodiment to provide linear induction propulsion of an air cushion vehicle, this figure being a transverse section through vehicle and tracks. The vehicle 30 rides a track 31, being supported by air cushions 32 and 33. It is propelled by a linear induction motor 34 acting on a flat inclined stationary conductor member 35 which is continuous along the track and branches. The track 31 is inclined as shown so that foreign matter automatically rolls off it and the vehicle is located transversely by two air cushions 36 (one only is visible in FIG. 5, the other being situated in another plane parallel to that of FIG. 5 but removed from it in a longitudinal direction with respect to the vehicle). Power is collected by a power collector 37 from 3-phase distribution rails 38. This is the condition between branches and junctions, and for branching left. For branching right, a second vehicle-mounted air cushion member 39 is lowered to the position shown and also a second power collector 40 is lowered to the position shown. At a branch in the track 31 both track surfaces temporarily remain in the same plane so that the right-hand branch rises slightly, the air cushion 36 and the power collector 38 being disconnected by reason of the motion of the vehicle. Continuity of power supply is ensured by the right-hand power collector 40.

According to the embodiment of FIGS. 6 to 11, FIG. 7 being a plan view foreshortened by appropriate breaks shown in the vehicle and the track, the vehicle 50 rides on four duplicated support wheels 51 over two track members 52. All the support wheels are provided with castor action, in this case by being pivotable about vertical axes 53, 54, 55 and 56 which are in advance of the centres of rotation of the wheels. Guidance is by four corner guide wheels 57, 58, 59 and 60, and centrally disposed intermediate guide wheels 61 and 62, which engage side guides 63 and 64. Because they are above the level of the track, these guides may be fitted close to the centre of pressure of wind gusts and/or the centre of gravity and this provides improved rolling stability. Due to the relatively high level of the guides 63 and 64, there is danger that if only the corner guide wheels were provided the guides would contact the side of the vehicle at the inside of corners and to prevent this intermediate guide wheels 61 and 62 are provided. As shown in FIG. 11, the true gauge of the guides 63 and 64 is adjusted on corners so that continuous guidance is provided by two end corner guide wheels 57,60 or 58,59 to one side of the vehicle and one central guide wheel 62 or 61 on the other.

Track selection at a branch is achieved by lowering either of two articulated pairs of guide wheels 65 and 66. For example, the condition when branching left is shown in FIG. 8 whereby the two guide wheels 65 are lowered. In this condition a check plate 67 overlaps the edge of the wheels 57 and 60 in order to provide additional stability in rolling and also wind protection is afforded by the guide members 63 and 64. For branching right, the articulated wheels 66 are alternatively lowered.

Alternative power distribution rails 68 and 69 are shown in FIG. 8, those to the left being shown engaged by the vehicle-mounted power collector 70. A similar power collector (not shown) is provided to the right of the vehicle 50, and when branching one or other is disengaged by reason of the motion of the vehicle and the other remains engaged to provide continuity of power supply. FIG. 10 shows an alternative arrangement with wide steel wheels 71 riding a track rail 72 and a relatively small articulated wheel 73 lowered to engage the side of the rail. FIG. 7 also shows roller buffers 74 fitted to the front of the vehicle 50. These are engageable with a full-width buffer 75 at the rear of each vehicle, and they may be used for sensing contact forces in a manner hereinafter described. The rollers 74 have vertical axes and are suitable for rolling transversely across the buffer 75 of a vehicle in front. FIG. 9 shows the desirable feature by which the lowerable guide wheels 65 are co-axial with the fixed guide wheels, 57 or 60 respectively, in order to maintain constant gauge around corners. One common axis is the line 76.

When branching right the guide wheels 57,60 may be disengaged from the guide 63 solely by reason of the transverse motion of the vehicle and similarly, when branching left, the guide wheels 58,59 may likewise be disengaged from the guide 64.

As an alternative arrangement, the wheels 65 and 66 may be used together, between branches and junctions, and the wheels 57 to 60 only for branching left or right. Check plates corresponding to that shown at 67 may be used with the wheels 65 and 66. This has the advantage of cheapness, but provides less freedom to select the height at which the guidance forces act. In any such means the vehicle may be located about a vertical axis of yawing, as well as in respect of lateral displacement, by means of the direct reaction forces upon the guide wheels.

With reference to the next embodiment illustrated, FIG. 12 is a transverse section through a vehicle 80 and a track 81. FIG. 13 is a plan view of the vehicle 80 on the support track 81 and FIG. 14 is a side elevation from the right-hand side of FIG. 13. FIG. 15 is a plan view of a branch in the track, the direction of vehicle motion being from the top towards the bottom of that figure.

The vehicle 80 rides the track 81 being supported by air cushions 84, 85, 86 and 87. It is guided by four air cushions, two to each side, which engage two guide members 82 and 83. FIG. 14 shows two such air cushions 88 and 89. Where the track 81 branches the members 82 and 83 separate as is shown in FIG. 15. They are renewed by corresponding members 82' and 83' after the branch has been passed.

FIG. 12 shows duplicated power collectors 90 and 91 engaged with duplicated power-distribution rails 92 and 93. By this means power supply is continuously maintained past a branch without resource to articulated power collectors, engagement and disengagement being accomplished by the lateral movement of the vehicle. Track selection is accomplished by pre-loading or locating the vehicle against whichever guide is to be followed. Such pre-loading may be accomplished by suction or by electromagnetism.

With particular reference to FIG. 16, the support cushions 84, 85, 86 and 87 (not shown) as well as the four normal guidance cushions 88, 89, 94 and 95 are pressurised by means of a motor driven fan 96 which takes suction through an inlet 97 and discharges past valves 98 and 99. For branching left valve 99 is closed, a valve 100 is opened and a spring-loaded restriction is brought into operation at 97. Thus the pump takes suction from a suction pocket 101 as well as from its ordinary inlet 97 and thereby reduces the pressure in the area of the pocket 101 and holds the vehicle against the left-hand guide 83. After the branch has been passed, the valve 100 is closed again, the spring-loaded restriction is removed from 97 and the valve 99 is opened. For branching right the valve 98 is closed, a valve 102 is opened and the spring-loaded restriction is introduced, a right-hand suction pocket 103 being operative. An important feature of this arrangement is that the air flow through the suction pocket is in parallel with another orifice, and preferably a larger one, which is spring loaded. By this means the equivalent to the spring rate of the suction pockets may be made very small whereby stability is reached in equilibrium with the pressure pockets 88,89 or 94,95 operating on the same guide 82 or 83.

FIG. 17 shows a section through an air pocket assembly whereby track selection may more readily be accomplished. The actual air cushion 103 is retained by a kinetic "air skirt" obtained by flow of air downwards and inwards through ducts 104. The reference 105 represents, for example, one or other of the vertical faces of the guide members 82 or 83. Inside the slipper assembly is a plenum chamber 106, which is pressurised through ducts 107 and from which air is supplied to the ducts 104. The wall 108 of this plenum is provided with means for elastic constraint (e.g. spring-bellows member 109). The said wall 108 is loaded by the net static pressure inside the assembly. By this means, movement normal to the slipway, with a lower spring rate than that provided by the air clearance 103 is provided by the piston 110 which slides within a cylinder 111. Suitable sealing devices are provided. According to this embodiment of the invention, there is provided a central pocket 112 which is connected by a duct 113 to the suction side of the vehicle-mounted fan, by a circuit resembling that which has already been described. The partial vacuum produced by this means, pre-loads the air slipper against the side guide so that, when the guides diverge at a branch, it follows the guide concerned. The duct 113 in this particular case is subject to an elastic constraint in tension by means such as a spring device represented diagrammatically at 109. Slippers of this type may be used to provide the vehicle with guidance for the required track selection. The balance area provided by the pocket 112 need not be operated while the vehicle is travelling between branches or junctions.

According to an alternative feature, the transverse location which is necessary for track selection may be accomplished by means of electromagnets carried by the vehicle. FIG. 18 is a transverse section through guide members 120,121 to illustrate such a feature. The vehicle 122 rides a rectangular track beam 123 supported on an air cushion 124. In this particular case, a linear induction motor 125 is mounted in the track 123 and the conductor strip 126 is carried by the vehicle 122. Guidance is by four air cushions, of which two 127,128 are visible and two others are situated in another transverse plane. Said guidance cushions slide over the guide members 120 and 121. At branches in the track conductor strips 129 and 130 are provided, as shown these strips being alternatively operable. Vehicle-mounted electromagnets 131,132 can engage, respectively the conductor strips 129,130. The drawing is not accurately to scale and the electromagnets 131,132 are closer to the conductor strips 129,130 than is there represented. Most conveniently, there are to be two electromagnets 131 and two 132, providing one electromagnet to each end and each side of the vehicle.

FIGS. 19 to 21 illustrate another method of accomplishing track selection for the above-described vehicle embodiments, all these three figures being highly diagrammatic transverse sections through part of a vehicle and its support track. FIG. 20 shows track-mounted and magnetizable conductor strips 140 and 141 engaged by vehicle-mounted magnets, or linear induction motors 142 and 143 whereby magnetic forces are produced which guide the vehicle. This is the condition between branches and junctions. FIG. 19 shows the condition for branching left. The linear induction motor or electromagnet 143 has been switched off and the vehicle is guided by the magnet or linear induction motor 142 operating on the left-hand strip 140. The corresponding conditions for branching right are shown in FIG. 21. FIG. 22 shows, again highly diagrammatically, the plan view for a branch in the track. It will be seen that the conductor strips 140 and 141 separate, and that additional conductor strips equivalent to them are supplied after the branch by conductor strips 144 and 145.

Figure 23:
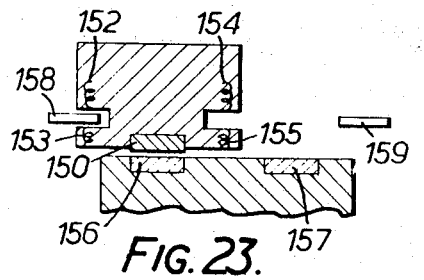
Figure 24:
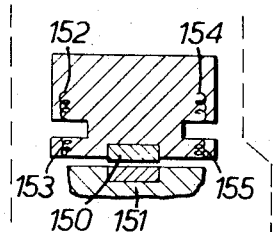
Figure 25:
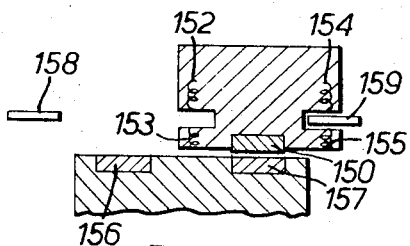
Figure 26:
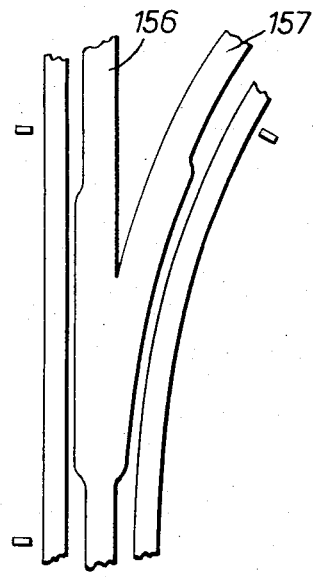

Yet another means of achieving track selection is illustrated in FIGS. 23 to 26, the views concerned corresponding to those of FIGS. 19 to 22. The vehicle is propelled by a linear induction motor 150 which acts upon the conductor strip 151 which is flush with the support surface of the track. FIG. 24 shows the condition between branches and junctions. Vehicle-mounted magnets 152,153 and 154,155 may be mounted in pairs so as to produce strong magnetic fields across the appropriate air gaps. Both plan views, FIGS. 22 and 26, represent vehicles travelling from the bottom of the figure towards the top. It will be seen that in FIG. 26 the conductor strip 151 branches into 156 and 157, and is slightly thickened to prevent a centring effect as the branch is re-approached. Side horizontal strips of a magnetizable material 158,159 are provided as the branch is approached and each continues on its appropriate side until the branch is passed. FIG. 23 shows conditions for branching left. The electromagnets 154 and 155 are switched off but 152 and 153 are switched on and their magnetic field acting on the strip 158 guides the vehicle to the left. FIG. 25 shows conditions for branching right when the magnets 152 and 153 are switched off, and 154 and 155 are switched on and, acting on the strip 159, the vehicle is pulled to the right. In this case, the magnetizable strips 158 and 159 are discontinued once the branch has been passed because then permanent track-mounted guides are renewed and engage vehicle-mounted followers in the manner already described. The advantage of the magnet arrangement just described is that relatively large clearances can be permitted.

FIG. 27 is a transverse cross-sectional view showing a vehicle 160 which rides a track 161, being supported by four air cushion pads of which two, referenced 162 and 163, are in the drawin. Guidance is by four air slippers 164 and 165 being shown, acting upon two side guides, 166 and 167. Track selection is by magnets 168 and 169, which may be vehicle mounted and retractable. At branches and junctions said magnets are alternatively engageable with magnetic channels 170 and 171, which complete the circuit for the magnetic lines of force. The advantages of this system are that the channels are more easily protected than protruding conductor strip, and at the same time this system allows larger clearances to be employed.

It will be seen that a number of the embodiments which have been described provide vehicles supported by wheels or air slippers or air cushions, and guided by wheels or air slippers or air cushions engaging with side guide members one to each side above the track level. An advantage of such an arrangement is that the guidance is applied to the vehicle in a position which can be relatively close to the centre of gravity and to its centre of transverse pressure. In addition, the main followers, be they air slippers or wheels, or other means, do not have to be moved in order to pass junctions on branches in the track. Means of support, i.e. wheels or air cushions and means of propulsion, i.e. wheel drive or linear induction, or air screw, may be interchanged between the embodiments described, that is to say where one embodiment is used to illustrate a means of propulsion and a means of guidance, then said means of propulsion and/or means of guidance may be used in conjunction with other means of propulsion or other means of guidance which are described in relation to other illustrative examples. In particular, linear induction may be used in conjunction with wheeled vehicles, and track selection by means of magnets may be used in conjunction with wheeled vehicles too.

FIG. 28 shows a section through a track 180, upon which a vehicle 181 travels. It is located by two guide members 182 and 183 which are above the level of the track. When track selection is taking place, a supplementary member such as an articulated follower, a vacuum suction pad or an electromagnet, holds the vehicle against whichever guide 182 or 183 is to be followed. As a safety measure against undue transverse wind loading or other transverse loading which might then pull the vehicle transversely away from the guide concerned, safety strips 184 and 185 to the right and 186 and 187 to the left are provided, the latter safety strips being operable so as to take up the positions shown in FIG. 28 for 184 and 185, in which conditions there is normally a working clearance although they provide positive transverse location in case of emergency. Safety members 184 and 185 are retractable from the positions shown, and members 186 and 187 are extensible from such positions to take up the corresponding operative positions. FIG. 29 is a plan view of a branch in the track 181, showing wind shields 188 and 189 provided specially in the vicinity of the branch.

FIG. 30 illustrates an embodiment in which a vehicle 190 rides a track 191 and is supported and guided by a combination of wheels 192 and air slippers 193. Track selection and guidance is as for any of the embodiments already described. In particular, air slippers may be used which are either self-pressurising (and possibly soft backed) or externally pressurised (e.g. so-called air cushions). Air slippers may be used for support and/or guidance at high speeds and between branches and junctions, and wheels may be used alternatively, for the same vehicle, for slow speeds, during track selection at branches, and/or at junctions.

FIGS. 31 and 32 show a vehicle 194 riding a track 195. It carries a linear induction motor 196 acting upon flush conductor strip 197, and is supported on air cushions (or slippers) which are not shown. Normal guidance is by vehicle-mounted air cushion or slipper members 198 and 199, which act upon the sides of the track, as shown in FIG. 31. To branch left, the air cushion or slipper member 199 is lifted to the position shown in FIG. 32, and a supplementary air cushion or slipper member (or pad) 200 engages a side guide 201. To branch right, the corresponding opposite-hand changes are made. FIGS. 31 and 32 both represent either of two parallel transverse planes which are basically similar, at different positions towards the front and towards the rear of the vehicle, respectively. The advantage of the horizontal conductor strip 197 is that track members do not need to move at branches or junctions. For operation in tunnels all four pads 198 and 199 may be lifted. Guidance is then by the four supplementary pads, arranged in pairs 200 and 202, engaging the guide 201 and a corresponding guide on the other side of the track. By this means tunnel size may be reduced.

Thus the vehicle 194 has means to select between four different modes of guidance. Firstly, by two pads 198 (one visible) and two pads 199 (one visible): this is the normal mode above ground. Secondly, by two pads 200 (one visible) and two pads 202 (one visible): this is the normal mode in tunnels. Thirdly, by two pads 200 (one visible) and two pads 198 (one visible): this is the mode for branching to or joining from the left. Fourthly, by two pads 199 (one visible) and two pads 202 (one visible): this is the normal mode for joining from and branching to the right.

With particular reference to FIG. 33, a vehicle 211 is essentially a luxury mini-bus. It seats eight persons, as shown in seats 212 arranged in line longitudinally of the vehicle. To assist entry and egress, the vehicle may be transversely tilted at stations, and a roof and side portion 213 hinges upwardly to the position shown for passenger entry. At one end the vehicle has a machinery compartment 214 and a compartment 215 at the other end houses control and ancillary equipment. The supporting mono-rail track is shown rather diagrammatically at 216 and the vehicle could alternatively carry a container measuring 18 × 5 feet × 3 feet 6 inches. The track 216 is supported at a height of 15' on spaced columns 216A.

The track 216 is of girder-like form and may comprise a Rolled Steel Joist (R.S.J.), or perhaps better, a prestressed concrete member, with integrally cast heating elements to prevent icing. The top and bottom flanges 217 and 218 respectively provide side edge guidance and stabilizing surfaces. Alternatively, instead of cast-in heating elements, steel wheels running on narrow guidance and stabilizing surfaces would help to prevent icing.

As can be seen from FIGS. 34 to 38, there are two cantilever arrangements 219 and 220 in the plane XXXV—XXXV and a further two 221 and 222 in the plane XXXVI—XXXVI. The arrangement 219 comprises duplicated guide wheels 223,224 and stabilizing wheels 225,226 — and similarly the arrangement 220 has guide wheels 222,228 and stabilizing wheels 229,230. The cantilever arrangements 221 and 222 each have two wheels only, e.g. 231 and 232 for 221. Wheels 233 support the vehicle 211 on the track 216. In the normal condition, i.e. not approaching or at a branch in the track, as shown in FIGS. 34 to 36 all the cantilever arrangements are extended downwardly alongside the track 216.

In the normal condition of FIGS. 34 to 36 the upper guide and stabilizing wheels 224,228 and 226,230 are inoperative whereas the upper and lower track flanges 217 and 218 are respectively engaged, on both sides, by the wheels 223,222 and 225,229 in the plane XXXV — XXXV and the upper flange 217 by the wheels 231,232 in the plane XXXVI — XXXVI. The wheels of the cantilever arrangements 219 and 220 are eccentrically mounted, as discussed hereinafter, and as a miniature vehicle is involved only one end is stabilized, i.e. guidance wheels only are provided in the plane XXXVI — XXXVI. However, in circumstances where stabilization of both ends is necessary, stabilizing wheels engaging the track flange 218 may be provided in this plane also.

FIGS. 37 and 38 show the condition for branching left at a track junction. An additional guide member 234 of channel form has engaged the second pair of guide and stabilizing wheels 224 and 226, of the left-hand stabilizing cantilever arrangement 219, and the right-hand stabilizing cantilever arrangement 220 has pivoted about an axis 250, and now lies in a horizontal plane retracted above the track. For right-hand branches and junctions, the operation is vice versa, with an opposite side guide member 235 engaging the wheels 228 and 230 of the right-hand cantilever arrangement 220 and the cantilever arrangement 219 retracted about the pivot axis 250. FIG. 38 shows the condition in the plane XXXVI — XXXVI for branching left, when a second guide wheel 236, preferably concentric with the wheel 231, has been lowered to engage the inner guide face of the track member 234. The right-hand guide wheel 232 has been raised, so as to clear the main track member 216 at the actual branch. Again, operations are vice versa for right-hand branches. It should be noted that none of the guidance and stabilizing wheels has any side-thrust along its axis. The load-carrying wheels 233 may be provided with conventional springing and suspension dampers. In addition, for operation over small radius curves, castor action may be provided for these wheels.

Concerning the pivoting of the cantilever arrangements for retraction and re-extension, it is an added attraction of steel guidance and stabilizing wheels, that no special provision is necessary to prevent scuffing on the surfaces they engage. The silence of pneumatic tyres could probably be obtained with solid rubber tyres. However, treadless pneumatic tyres may be used for the guidance and stabilizing wheels, because they operate on vertical surfaces and, in any case, have no frictional load. The main disadvantage of pneumatic tyres is the possibility of scuffing, referred to above. To prevent this, the guidance and stabilizing wheels concerned should first be disengaged from their respective track surfaces. One mechanism for doing this is shown in FIGS. 39 to 41, this being necessary for use with pneumatic tyred wheels only.

FIG. 39 is a transverse section on the line XXXV — XXXV in FIG. 34 showing the cantilever arrangement 219 in some detail. The main stabilizing cantilever member 251 is rotatable about the axis 250 on a shaft 252 by means of a crank 253. This crank is shown angularly displaced and is controlled by a compressed air cylinder and locking device (not shown). A sleeve 254 comprises four eccentrics 255, 256, 257 and 258 upon which are mounted the guidance and stabilizing wheels 224, 223, 226 and 225. They are shown in FIG. 39 for the conditions corresponding to FIG. 37. The axes of the two pairs of eccentrics are indicated by the lines 259 - 260 and 261 - 262, respectively. That of both the sleeve and the cantilever member is the line 263 - 264. FIG. 40 shows the corresponding plan view of the positions of these axes aligned laterally of the vehicle. 265 is a compressed-air operated angular displacement motor (for example of vane type, or crank and cylinder), by means of which the sleeve is rotatable through 90°, relative to the main cantilever member 251. Such rotation brings the axes into the positions shown in FIG. 41, i.e. aligned longitudinally of the vehicle, thereby withdrawing all the wheels from their respective guidance and stabilizing surfaces.

The retractable cantilever arrangements described could be less expensive than might appear. This is because weight is not very much restricted, and consequently the stresses can be low. Constructional detail is not shown in FIG. 39. The steel cantilever members 251 fit the sleeves 254 at specific bearings only. The sleeves may be of welded steel tube. External eccentrics and internal bearing housings can be of mild steel, welded in place before final machining.

FIG. 39 also shows means for damping torsional oscillations from the vehicle. The shaft 252 mounts a piston 266 which fits a cylinder formed in the boss of the main cantilever member 251. This cylinder is pressurised with oil through pipes 267 and 268. An air spring acts upon the oil, through a reservoir 269. The guide wheels are normally pre-loaded against the sides of the track, and remain so pre-loaded, in spite of moderate variations in track thickness. Torsional oscillations in the vehicle cause the cylinder to move, relative to the piston 266. Damping is achieved by restricting the oil flows communicating with the two ends of the cylinder.

A simplified form of cantilever arrangement is shown in FIG. 42. Coaxial wheels 224A, 223A, 226A and 225A are progressively smaller in diameter, in the order given. They correspond respectively to the wheels 224, 223, 226 and 225 already described. Thus, during the pivoting of the cantilever on retraction, each wheel clears the guide surface or surfaces above it.

An alternative approach is shown in FIGS. 43 to 45. Two cantilever members 301 and 302 are rigidly joined by a rocker 303 which pivots on a shaft 304 provided with bearings in two anchorages 305 and 306. Pivoting is controlled by an air cylinder (not shown), whose axis is 307, and which joins the trunnion 308. Four steel wheels 309 to 312 are shown engaging the track 216 and guide member 234. They are mounted in bearings carried by rockers 315 to 318, which are mounted on bearings on the cantilever member 301. These wheels are loaded by four lugs, of which only two numbered 319 and 320 are visible. The arrangement is shown in FIG. 45. Lug 320 is a welded extension to the cantilever member 302. Backing on to it is a hydraulic compression cylinder 321, the other end of which engages the lug 322, which joins the upper and lower portions of the rocker 317. The other cylinders, 322 to 324, are shown in FIG. 44. The cylinders could be double acting, but if single action is preferred, smaller cylinders 325 to 328 may be provided, with suitable end lugs, to act in the opposite direction. The cylinders control the loading of the cantilever wheels, providing either sprung and damped pre-loading, for guidance or disengagement.

The construction just described provides independent suspension for all guidance and stabilizing wheels. Positive location may be provided by making the spring rates, on one side only relatively high. Track tolerances may be eased and, at the same time, controlled damping offers stability at higher speeds.

FIG. 46 shows caliper brakes which may be fitted to grip the track sides, preventing skidding. These are preferably to be used in conjunction with an inertia-controlled servo, to ensure compatible retardation in adjacent vehicles. Rockers 350 and 351 pivot at 352, being actuated by a cylinder 353. Pads 354 and 355 normally clear the top of the track 216 at branches and junctions. At other positions, however, they can be closed to grip the sides of the track. If it is desired to provide braking, even at branches and junctions, the arrangement shown may be rotated through 90°, so that it grips the side of one track flange from above and below. The lower rocker then has more travel, and one caliper is provided on each side.

Power distribution rails 240 are normally fitted to one side of the track member, as shown in FIGS. 35 and 36. However, to accommodate branches and junctions, they have to be fitted to both sides, as shown by 240 and 241 in FIGS. 37 and 38. Retractable power collectors 242 are used, and these may provide the basis of a fail-safe system.

Interlocking safety features eliminate all possibility of accidents, due to malfunctioning of the cantilever wheel retraction feature. However, to provide a psychological sense of security, safety barriers 356 may be provided at branches and junctions as shown in FIGS. 37 and 38.

Since the described embodiments do not use bogies, curvature produces some apparent change in gauge. In all cases, to varying extents, this can be accommodated by varying the real gauge, as shown diagrammatically in FIG. 47. This represents a mono-rail traversing a 28' radius curve. Wheels 357 are guided by the track 358. Note that the track width, "W" is less, for the curved portion than for the straight. Note also that the geometrical principle is disturbed at portions of the track where changes in curvature occur. Then the attitude of the vehicle is not the same when the rear passes a given position on the track, as it was when the front did so. This effect may be reduced by providing gradual changes in curvature, but some wheel resilience is required. This can readily be provided in certain embodiments, less so in others.

For the mono-rail and some other embodiments, extremely small radius curves may be negotiated by vehicles when they are in one, or sometimes either, of the branching conditions. This is because the equivalent to "gauge" is then no more than the distance separating the axes of the opposed guide wheels. This is very small, in any case, and can altogether be eliminated.

FIG. 48 shows a special feature, which can be used to enable airport luggage trolleys to cross an apron. A single cantilever member 360 is flattened, being of thin rectangular section aligned longitudinally of the vehicle 361, to operate through a narrow slit 362. Thus the movement of aircraft and other vehicles is not impeded. Distribution rails 363 are on the right of the concealed trench 364 in which the cantilever arrangement shown as operative in FIG. 48 runs. The trench is closed by removable slabs 365. This offers a relatively small-scale initial application, in which small vehicles could run containers right up to the aircraft.

In general, the preferred type of power collector would somewhat resemble that of the Westinghouse "Transit Expressway". Three or four closely grouped distribution rails are sited either beneath or to one side of each vehicle.

Track selection demands special provision in the neighbourhood of branches and junctions. Two alternative sets of distribution rails, each with its own collectors in each vehicle, must there be provided. In general, it is desirable that power collectors not in use should be retracted. In the case of the above-track mono-rail, this is obligatory, and may be used as a fail-safe mechanism.

Whilst the power collector shoes may be utilised as a control member in the mechanisms affected when the vehicle approaches a junction, this is not necessarily so. The control signals may also be derived from the other track signalling media and the general principle as negotiating a branch or junction is as follows.

The collector shoes are raised or lowered by a mechanism employing pivoted links and/or sliding members.

The mechanism may typically be operated electrically, pneumatically or hydraulically to suit the vehicle arrangement. The collector shoes are required to move laterally prior to lifting to clear the top of the rail flange. Alignment and vertical registration of the collector shoes may be assisted by guide wheels 370 and 371 locating against the inside of the track flanges as shown in FIGS. 35 and 37.

When a vehicle approaches a junction the appropriate set of cantilever guidance and stabilizing wheels must be raised and then lowered again after the junction has been passed. Since the safety of the system is dependent on the correct synchronisation of this action the modus operandi is as follows.

FIG. 49 shows the plan view of a mono-rail track, the section at A being as shown in FIGS. 37 and 38. Vehicles approaching the junction from the direction indicated receive a signal at A showing that the junction zone has been entered. This signals a programming unit (pre-arranged route) in the vehicle to disengage the appropriate collector shoes on one side and also raise the associated set of guidance and stabilizing wheels. For example, if the vehicle had been programmed to take the right-hand path at the junction, then clearly the left-hand sets of collector shoes and guidance and stabilizing wheels would require to be raised.

By the time the vehicle has reached point B the retraction process should have been completed, but if on receiving a track signal at B retraction is not complete and correct, then an emergency stop facility is automatically triggered, so that the vehicle can be safely brought to rest before reaching the junction at C. The lengths of track AB and BC depend on the maximum speed involved for the particular track section, being greater on higher speed sections of track.

After the junction has been negotiated by the vehicle a signal from the track at D causes lowering of the retracted cantilever arrangements which again must be correctly completed and locked by the time the vehicle reaches E. Again, any failure to correctly lower the power collector shoes and cantilever wheels results in an emergency stop so that the vehicle can be safely brought to rest before the point F at which the track guide member 234 or 235 is discontinued. Similarly the criterion of speed defines the distances DE and EF.

Thus safety is ensured both in the retraction process prior to the junction and the restoration process after the junction. The collector shoes may be embodied in the guide and stabilizing wheel mechanism, to suit the mechanical design considerations for the particular vehicle.

The fail-to-safety philosophy is enhanced by duplication of the control system and sensing members in a parity check arrangement. This significantly improves the operational security by initiating an emergency stop unless both independent control systems maintain parity of decision at all times. Independent dual track signals and mechanism locked position signals are used. Additionally a direct mechanical interlock makes it impossible to raise both the left and right-hand sets of cantilever guidance and stabilizing wheels simultaneously.

Figure 51:
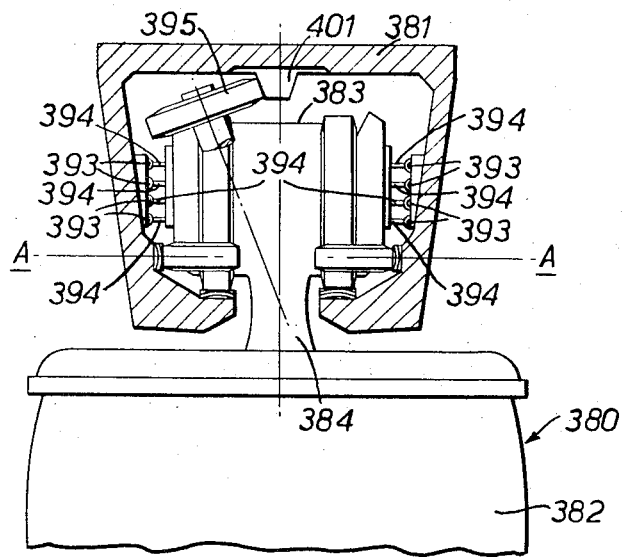
Figure 52:
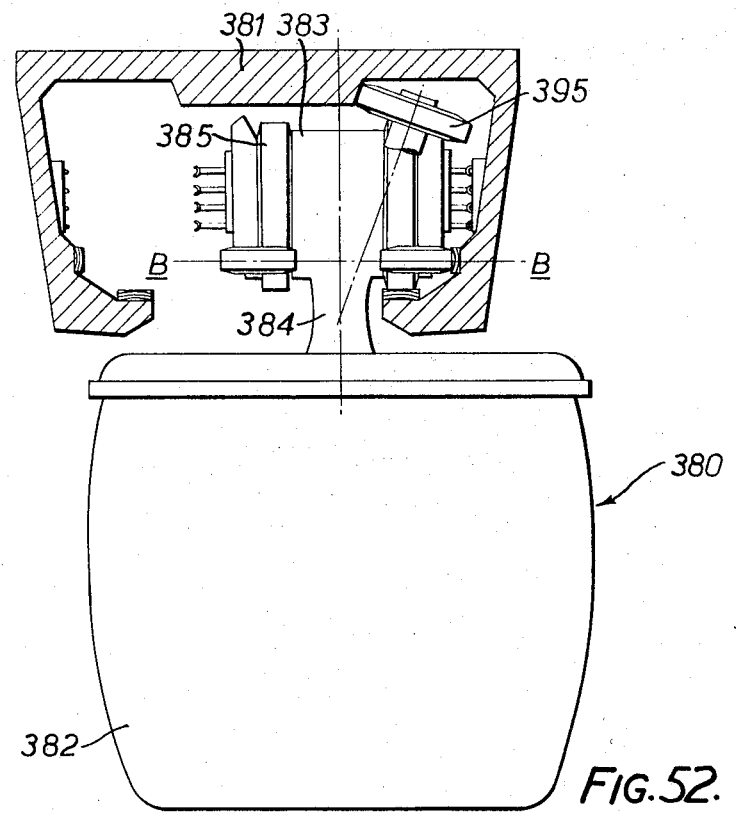

The invention may be applied to a suspended mono-rail as is shown in FIGS. 50 to 55, of which FIG. 50 is an end view of the mono-rail vehicle 380 in its position for branching left and showing a transverse section of the track member 381. FIG. 51 is a corresponding view in the normal position on approaching a branch or a junction, FIG. 52 is the condition when branching right, FIG. 53 is a plan view showing the track 381 sectional horizontally, FIG. 54 is an inset showing additional safety features and FIG. 55 is a scrap section showing other additional safety features.

The vehicle body 382 is suspended from a bogie member 383 by means of a linkage 384. It is supported by four wheels 385, 386, 387 and 388 which are represented as having pneumatic tyres and riding hardwood tracks. The bogie is guided by four horizontal wheels 389, 390, 391 and 392 and said guide wheels may be provided with castor action, about axis B — B. Electric motors are incorporated in the bogie itself and power supply may be by duplicated sets of distribution rails 393 which are engaged by corresponding power collectors 394. Said power collectors are not articulated relative to the vehicle but are spring loaded outwards and provided with stops. Thus when the two sets of distribution rails separate at a branch or a junction, one or other side is temporarily disconnected but the other maintains contact and provides power. Three rails are for three-phase power distribution and the fourth for communication purposes.

Track selection wheels 395 and 396 are joined by a beam 397 and both are pivotable about a common axis 398. The wheels are joined to bearings on such axis by means of links such as 399 which is partly cut away in FIG. 50. Stops 400 are rigidly connected with and spaced laterally of the bogie frame in order to engage two respective sides of the beam 397. By this means the links joining the wheels 395,396 to bearings with axis 398 can pivot by a limited angle only to each side of the mid position. Means are provided to pivot said wheels to either side of the bogie. For example, FIG. 51 shows them pivoted to the left. On approaching a branch or a junction, a central track member 401 engages said wheel and thereby guides the vehicle into the required side of the branch. Subsequently first the guide wheels and power collectors and then the support wheels from the other side of the bogie become disengaged and the vehicle is maintained in an upright position or banked as required by the track member 401 which engages the two track selection wheels 395 and 396. FIG. 50 shows the condition for branching left and FIG. 52 that for branching right.

In order to facilitate equal load distribution between the wheels 395 and 396 during transition conditions leading to and/or following from junctions and branches, the two wheels 395 and 396 may be provided with means for self-alignment with the central track member 401. This may be provided by incorporating a degree of flexibility into the supporting linkages. For example, the beam 397 may be stiff, in order to carry the necessary load without undue deflection, but it may be provided with limited freedom to pivot about whichever of the stops 400 with which it is in engagement. As an additional precaution, in case of fracture of one wheel, or of the beam itself, limit stops may be provided to restrict the ultimate angular travel of the pivoting links which secure the beam (e.g. the link 399).

All wheels may be provided with means for castor action, in order to facilitate free movement without scuffing. This is possible because the entire bogie functions by virtue of the direct reaction forces normal to each set of wheels, being independent of side acting frictional loads between the wheels and the tracks. The axis of castor action for wheels 395 and 396 is the line C — C, and those for the support wheels are the lines D — D and E — E. That of guide wheels is B — B.

In the case of small vehicles, the suspension structure may resemble a single bogie, and internal buffers 402 and 403 may be provided, to allow them to operate as contact trains, as hereinafter described.

In cases when two bogies are used, a connecting link 404 may be provided to join them and transmit thrusts between them. Thus the front buffer of the front bogie and the rear buffer of the rear bogie may both be used, without contact loads being transmitted to the body of the vehicle. This is an advantage on curves because said loads then produce radial components which it is desirable to retain close to the level of the guide wheels in order to minimise the couple produced tending to roll the vehicle.

The buffers 402 and 403 and the link 404 are shown only in FIG. 53. FIG. 54 shows an optional keep plate 405 and safety disc 406 which can, if desired, be provided in order to provide additional safety. Similarly FIG. 55 shows two vertical retaining strips 407 and 408 which run parallel to each side of the branching in the tracks and are alternatively engageable with safety discs 409 and 410 which are mounted coaxially with the support wheels. FIG. 55 shows the condition for branching left. Before the keep strips 407 and 408 commence the bogie is slightly displaced to the left and consequently the disc 409 is engaged by the strip 407 but the disc 410 on the other side is outside and not engaged by the strip 408. Thus the vehicle is free to branch left and cannot possibly be displaced from the track by side forces such as exceptional gusts of wind. For branching right it would be forced to the right and similarly the disc 410 would engage the strip 408. If desired, suitable tracks may be provided so that the discs 409 and 410 act as safety discs in case of tyre deflation. Said discs are of course fitted to all four support wheels. A variant provides for the fitting of the discs and safety strips to the outside of the wheels instead of the inside as shown. In addition, safety strips 411 and 412 may be provided to engage discs on the guide wheels, 413 and 414, in order to eliminate all chance of the lifting of discs 409 or 410 which might otherwise enable them to escape the safety strip 407 or 408.

This embodiment provides all the advantages of track selection in extremely simple form where the load itself locks the track selection wheels in place.

FIG. 56 shows the application of linear induction to the vehicle shown in FIGS. 50 to 55. A linear induction strip 415 is mounted in the top of the track beam and engaged by a linear induction motor 418. In this construction the wheel 395 has been replaced by two wheels 416 and 417 which are alternatively engageable with the guide track member 401.

Figure 57:
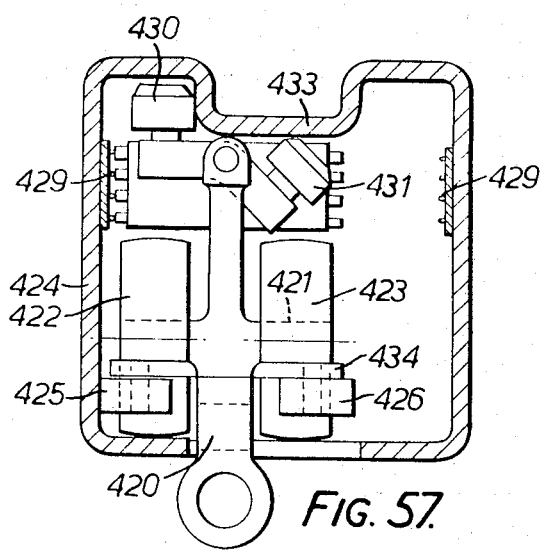
Figure 58:
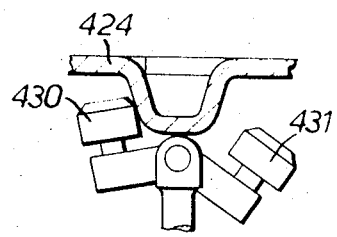
Figure 59:
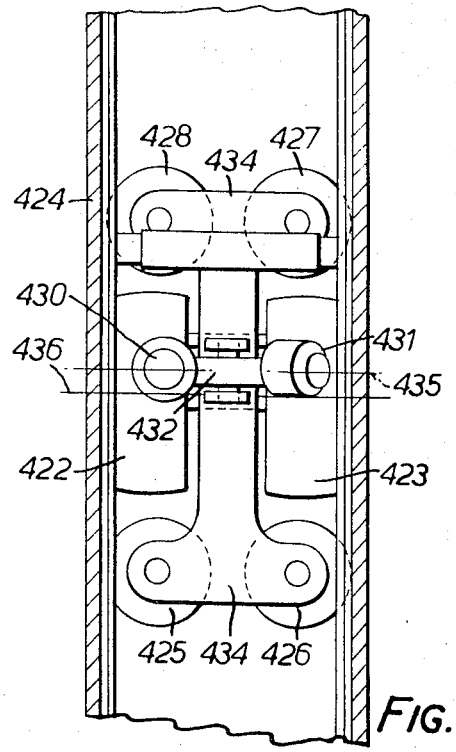
Figure 60:
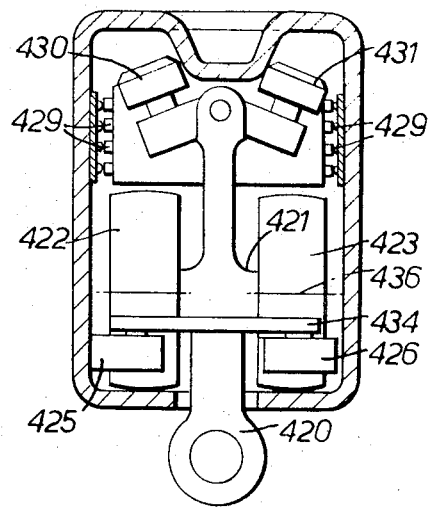

FIGS. 57 to 60 show a variant of this type of suspended mono-rail. FIGS. 57 and 60 are transverse sections, FIG. 59 is a plan view showing the track in section and FIG. 58 is a transverse scrap section.

A suspension link 420 is joined by a cross-head 421 to two support wheels 422 and 423. These support wheels have spherically curved peripheries to facilitate cornering, and they ride the lower webs of the track member 424. Guidance is by four horizontal guide wheels 425, 426, 427 and 428 whose axes are vertical. FIG. 60 shows the normal condition on approaching or leaving a branch or a junction. Power collectors and distribution rails 429 are duplicated. In this case two track selection wheels 430 and 431 are mounted on a rocker member 432 which member is provided with a means for pivoting, in order to guide the bogie into the required side of the branch. FIG. 57 shows the condition for branching left, and it will be noted that the guide member 433 is wide and would engage the end of the disengaged wheel, if necessary, in order to prevent disengagement of the engaged wheel 430. FIG. 60 illustrates how the two sides of the rocker arm are of unequal length so that in case of failure of the operating mechanism, the vehicle is directed to one side of the branch positively in order to provide fail-safe features.

If it is desired to provide castor action, then this may be done in two ways. Preferably the two leading guide wheels 428 and 427 fit their tracks more closely than the wheels 425 and 426 so that any transverse force, such as might cause the support wheels to be displaced, will pivot the bogie about a vertical axis and cause the support wheels to steer back to the centre of the track. Alternatively, the cross-head 421 may be pivotable in the bogie frame 434 and the centre of such pivoting may lie upon the line 435 which is slightly in advance of the axis of rotation 436 of the support wheel. This provides ordinary castor action.

Another version of suspended mono-rail is illustrated diagrammatically in FIGS. 61 to 64. FIG. 61 is a plan view of a branch in the track over which motion is supposed to be from the top towards the bottom. FIGS. 62, 63 and 64 are sections, to show the track and one pair of wheels of the vehicle bogie, in planes I, II and III respectively. The vehicle is normally supported from externally flanged wheels 450 and 451.

The support wheels 450 and 451 are each mounted upon a link which is provided with means for pivoting about an axis 452. A track selection wheel 453 is mounted on a pivotable link so that, on approaching a branch in the track, it can be positioned either as shown in full lines in FIG. 62, with axis of rotation 454, or as shown in broken lines with axis of rotation 455. The pivotable link upon which the track selection wheel is mounted is connected by stops with those mounting the support wheels. For example, see FIG. 63 which shows conditions for approaching a branch to the left. The track selection wheel has engaged the surface of a cam member 456, and displaced both support wheels to the right so that the outside of the flange of the wheel which is to support the vehicle is engaged, for example, by a retaining strip 457 and the flange of the wheel which is to be disengaged passes outside an opposite side retaining strip 458. The retaining strips 457 and 458 are parallel to the outside of the two branching tracks, the track 558 being of flanged I section. The track selection wheel 453 engages the track cam 456 in a manner similar to that which has already been described and subsequently as shown in FIG. 64. It causes the right-hand support wheel to be disengaged and impelled downwards to the position shown. The original conditions are restored when the branch has been passed. For branching right, the conditions are vice versa.

Figure 65:
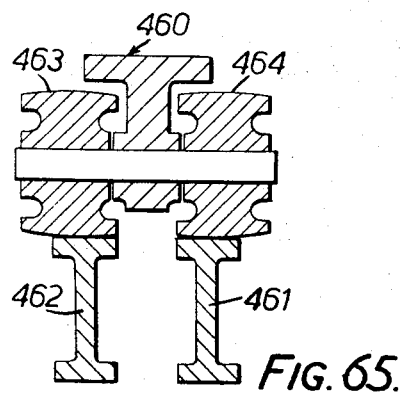
Figure 66:
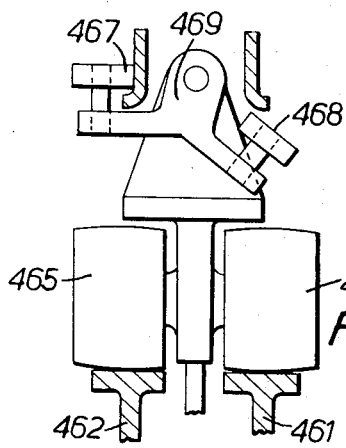

FIGS. 65 to 68 illustrate an embodiment in which a bogie 460 rides above two separate track members 461 and 462. FIG. 65 is a scrap section through rear support wheels 463 and 464 and FIG. 68 is a plan view of the tracks. FIG. 66 is an end elevation showing the track and guides in section, and FIG. 67 is a longitudinal section.

The support wheels 463 and 464, and front support wheels 465 and 466 ride the track member beams 461 and 462. These branch is as shown in FIG. 68. Track selection wheels 467 and 468 are mounted on a rocker 469 and these impel the bogie to follow one side or other of the branch, and whichever side is followed the support wheels bridge the gap. In order to prevent any displacement of the bogie upwards or downwards, the peripheries of the support wheels may be spherical and the appropriate portions of the top of the track, as shown shaded in FIG. 68, may be slightly raised as the gap is reached. In this way continuous support is provided. Castor action is provided by mounting the leading support wheels 465 and 466 in a trailing pivot member 470.

Referring now to FIGS. 69 to 71, FIG. 69 is a transverse section through a track 478 showing an end elevation of the bus 471, FIG. 70 is a corresponding side elevation and FIG. 71 a plan view. The bus steering is controlled by either of two bus-mounted followers 472 or 473. Said followers are pivotally mounted in the bus at one end, and are alternatively or simultaneously spring loaded outwards so that wheels 474 mounted on their tips engage, respectively, guide members 475 and 476. Each of the members 472,473 is connectable to the steering of the bus, so that any displacement to either side of a nominal datum position such as, for example, the axis 477 for the follower 472, causes corrective steering action to be taken. Means are provided to spring load one or both followers outwards to engage the guide members 475 and 476 and also to connect and to disconnect the linkage between the follower and the steering of the bus.

To branch left the left-hand follower is engaged. To branch right the right-hand follower is engaged. The guide members 475 and 476 are formed as kerbs at the edges of a track member 478, on which the bus support wheels 479 run.

This system has positive advantages compared to guidance by a follower in a groove in the middle of the road. Firstly, space is available for robust followers 472 and 473 to be fitted, with wheels 474 of the proper size, so that loading forces may be increased without wear. Secondly, the guidance system is designed primarily for operation on elevated or separate tracks 478 and for these the side guides are very much more convenient as well as providing safety. It is also preferable to loading the vehicle to steer against a fixed follower, because such loading necessarily exceeds the maximum transverse loading, due to factors such as wind or transverse gradient. Thus it is unnecessarily high under normal conditions, and causes unnecessary tyre wear.

Any of the embodiments which have been described may be propelled by linear induction in any of the various ways which have been described or by other means in accordance with the state of the art. Alternatively rotary motors or engines of any type may also be used. High density traffic is being considered and thus electric traction is felt to be the natural choice. In general all vehicles are self-propelled and may either carry batteries, or be supplied with power from an external source through distribution rails or overhead wires, or the two systems may be combined for different parts of the same journey. For miniature vehicles, low level distribution rails may be used mainly for aesthetic reasons. For economy and reliability, three-phase squirrel cage induction motors are preferred.

In normal conditions, according to my proposals for speed control, all vehicles are to have the same nominal speed when they are on the same section of track. This is fundamentally safe, and provides the best starting point for any system of automatic control. However, for various practical reasons, four special exceptions are made as described hereinafter. The nominal speeds themselves are to vary between different sections of the track. This variation is introduced by varying the frequency and voltage of the power supply in different sections of the track.

The foregoing retains the advantages of speed variations to suit the track, but eliminates variable speed drive from the vehicles themselves, except for the speed trim hereinafter mentioned, and consequently reduces both cost and maintenance requirements for the vehicle. It is not necessary for motors to develop full power at low speeds because with track selection the number of intermediate stops is reduced and consequently acceleration is relatively unimportant. FIG. 72 represents diagrammatically arrangements for accelerating a vehicle. Distribution rails 480 are divided into electrically separate sections such as 481. Each section is supplied from a separate power supply at a frequency and voltage which may differ from that of adjacent sections. These supplies are provided by means of static or rotary inverters 482 operating from 50 c.p.s. mains.

As the frequency is reduced, the motor speed is reduced, and the applied voltage must also be reduced, in order to limit the motor output to approximately full-load torque. Nevertheless, for transitory conditions such as starting or short gradients, exceptions may be made to this. FIG. 73 represents the acceleration ladder for such a vehicle. It shows motor relative torque plotted against vehicle speed (horizontal). Each torque-speed graph corresponds to the power frequency at one section of the track. The motor starts along the graph 483 which corresponds to a 2 miles-per-hour section. It follows this graph downwards until it reaches the point 484. This corresponds to a transfer to the following 4 miles-per-hour section, and the motor is transferred to the graph 485. This step by step acceleration process is continued until the desired normal running speed is obtained.

A speed trim is provided. This is a vehicle-mounted speed control with an operating range of the order of plus or minus 5 percent from the nominal speed. In the case of a simple system, single step adjustments would be acceptable, but infinite variation within the same range is preferred for advanced systems. The speed trim is used in order to adjust each vehicle so as to conform to those leading or following it, for separation control and for the operation of contact trains, i.e. a series of individual vehicles running in end to end contact, and in order to compensate for individual variations between vehicles. It is not readily accommodated electrically, due to the fundamental relationship between frequency, speed and load and a preferred means is illustrated in FIG. 74. A squirrel cage rotor 490 drives the vehicle through a coupling 491. It is supported in bearings, 492 and 493, in the associated wound "stator" 494. This is itself supported in bearings, 495 and 496, in a casing member 497 and electrical power is supplied through slip rings 498. The wound stator 494 is trimmed for "bucking" and "boosting" by a small motor 499 through, for example, a worm and worm wheel gear coupling 500.

In general, power collectors and distribution rails are duplicated at branches and junctions. Wherever possible these are above the track level so that articulated power collectors are not required, however, where necessary they may be placed below the track level using articulated power collectors provided with a guide to ensure correct alignment before contact is made.

Vehicles may be stopped on any section of the track by an emergency stop control. Special provision is made for subsequently restarting them. For example, an automatic changeover may be provided signalling so as to switch over from normal supply to a low frequency low voltage supply over the section of track involved in the stoppage. This would move vehicles forward at a low speed to the nearest "berth" transmitter, as described hereinafter. The automatic changeover signalling would be initiated whenever an emergency stop had been invoked. Reversal to normal would have to follow the clearing of successive sections of the track according to a pre-arranged system.

Regenerative braking, possibly implemented by D.C. injection braking, becomes a feature of the proposed variable frequency induction motor arrangement. However, friction brakes are necessarily provided. These are to be applied automatically in case of a power failure and may also be integrated with the speed trim or vehicle contact control. In addition, means may be provided to apply the brakes automatically to any vehicle which overspeeds by more than a prescribed margin.

Control sections may be provided as an elaboration, for use at the highest track densities. These are sections of track the power supply to which is variable, most usually to two fixed frequencies only. They are normally governed by a "zone control unit" and have two possible functions. Firstly, by providing an optional reduced speed section an optional delay in the time of arrival of traffic at a downstream junction is provided, and vice versa. Secondly, by this means the pitch of contact trains or individual vehicles may be increased or decreased. This facility may be used to form longer trains. For example, if a high flow of traffic was reached by a series of contact trains of assorted lengths, together with independent vehicles, then it might become difficult to fit in trains from joining lines. On being closed up, longer contact trains would form. This would not only create a gap downstream of the group of vehicles concerned, but it would do so without necessarily decreasing the mean value of the separation distance.

Between sections of track which have differing frequency, continuity of power supply is desirable for driverless automatic vehicles. A proposed solution for achieving this is shown in FIG. 75 which is a diagram showing collector shoes 501 and 502 moving from left to right in that figure. The engaged distribution rails 503 and 504 have different power frequencies. These rails are separated by an insulated section 505 of adequate length. The collector shoes 501 and 502 are connected to a static switch 506 which can be rapidly switched in order to draw power from either of the leading or the trailing shoes. As the vehicle approaches the end of one section of the track power is being taken from the trailing shoe 501. The associated control system reponds to a differing frequency at shoe 501 and shoe 502, which occurs as the vehicle reaches the end of the section, and the leading shoe 502 then makes contact with the distribution rail 504. This differing frequency causes the static switch to change over so that power is taken from the leading shoe 502. Shoe 501 is therefore switched off by the time it reaches the end of the section. No arcing therefore occurs adjacent to the insulated section 505. When the vehicle has completely passed the section, both shoes are in contact with the distribution rail 504 and there is no disparity in the frequency detection by the shoes. This frequency parity is used to signal the resetting of the static switch 506 after a pre-set time delay so that power is again drawn from the trailing shoe 501 in readiness for approachine the next section change, when the process is repeated.

FIG. 76 shows a section through a track for the above-track mono-rail which has been described showing four distribution rails 510 and four collector shoes 511 in engagement with them. Two wheels 512 and 513 align the power collector with the track member to ensure correct initial engagement with the distribution rails. The power collector is retracted by rotation about an axis 514 which is parallel to the direction of motion.

FIG. 77 shows the conditions in the vicinity of a branch or junction of the track. It will be noted that there is a set of distribution rails 510 or 515 on each side of the track and these are simultaneously engaged for a considerable distance. Vehicles are normally stopped on low-speed "tertiary" sections of track. The final stages of deceleration are under the control of a berth transmitter which progressively reduces the frequency and voltage of successive short track sections. Each berth transmitter is associated with definite frequencies and voltage for prescribed sections of track. For example, FIGS. 78 and 79 show the appropriate nominal speeds for the same sections of track under the control of berth transmitters 516 and 517. FIG. 78 shows the nominal speeds when the berth transmitter 516 is in operation, and FIG. 79 shows those for the berth transmitter 517. Note that the lower speeds of 2, 4 and 8 miles an hour are shifted, depending on which berth transmitter is used. Berth transmitters are normally under the control of station control units, and vehicles stopped adjacent the berth transmitters are in communication with station control units.

Station control units are provided at all stations and parking sidings. Their function is to allocate berths and to stop and start vehicles, in the correct sequence and acting through bert transmitters. In complex systems the station control unit may be computer controlled.

Each station control unit also comprises a two-way signal unit (hereinafter referred to as of "type D") which detects approaching vehicles so that the necessary berths are allocated. In the case of parallel sections, or parking sidings, the station control unit acts on the track selection control directly through track-to-vehicle signal units in order to direct each vehicle into the correct platform. For this purpose a distant signal unit may be used, overriding a vehicle-mounted programming unit which control the route taken at track branches. The station control unit may also cause the separation control of vehicles to be temporarily disconnected so that they are brought to rest in contact with one another. Provision is made to move along waiting vehicles by the station control unit acting through berth transmitters.

The initial track system of FIG. 80, such as would be used to connect an urban centre 518 with an airport 519, has two tracks 520 and 521, one in each direction, and these are joined by loops 522 and 523 at the ends. Associated with the loops are simple series parallel stations 524 and 525.

FIG. 81 shows such a station, in particular the station 525, on an enlarged scale. A number of vehicles can stop in series either at berths 526 to 530, or at berths 531 to 535. Numbers 526' to 535' indicate the corresponding berth transmitters. Numbers 536, 537 and 538 indicate signal units type D, D, and A, respectively, controlling track selection function, and 539 is the two-way distant signal referred to above. "Type A" signal units are defined hereinafter. Waiting berths 540 to 544 are used so that incoming traffic can form short trains which all move in together, thereby increasing the carrying capacity of the station at rush hours.

In general, communication between vehicle and track is by cams or electromagnetic inductive devices, known as signal units. Such signal units may act from track to vehicle, or vice versa as required. There are six types of signal unit, identified and defined as listed below:

Type A. Conveys a constant track-to-vehicle signal, advancing the programming unit of each passing vehicle by one step.

Type B. Conveys a constant track-to-vehicle signal which acts directly upon a vehicle's track selection control, causing it to select the right-hand means of guidance. Usual before right-hand junctions.

Type C. As for type B, but left-hand.

Type D. A two-way signal unit, under external control from a track control position. It acts directly upon the track selection control of a passing vehicle causing it to select whichever side for guidance, as commanded. It also detects each passing vehicle, and is provided with means to convey that information to its own command position.

Type E. A vehicle-to-track signal unit, used to inform a berth transmitter that an approaching vehicle is programmed to stop at that transmitter. Usual on tertiary tracks.

Type F. A track-to-vehicle signal unit, governing separation control.

Every vehicle may carry a track selection control by means of which it selects or makes operative the guide member which it is to follow at branches and junctions. Where appropriate, this also operates retractable power collectors. The track selection control is most commonly operated by the vehicle-mounted programming unit. However, it is directly controlled by certain signal units, for example of types B, C and D.

In cases where wheels or other followers are articulated for purposes of track selection, then the track selection control may cause this to be done through electric, hydraulic, compressed air, or vacuum circuits, and said circuits may be common to several track selection assemblies within one vehicle or coupled unit, in order to ensure similar operation. Operation is preferably to take place immediately the preceding branch has been passed, initiated by means of signal units type A.

In the case of constructions where vehicles are pre-loaded to one or other side of the track, for track selection purposes, by means of magnets, then the track selection control operates the appropriate electrical circuits to energise magnets as required. In the case of vehicles whereby this is done by change in the air circuit, to and from a vehicle-mounted fan, then the appropriate valves are operated by the track selection controls.

There is a pre-recorded set of left and right-hand branches to route a vehicle from one point to any other point on the system. The function of the programming unit is to cause every vehicle to select the correct sequence of such right and left-hand branches in order to reach its individual destination. A signal unit advances it by at least one step for every branch. In the case of a simple system, it may well be a punched card or ticket which is pre-programmed to list the ocrrect routing from a given starting point to a destination. The ticket would be automatically scanned by a card reading device in the vehicle as the various routing actions were completed.

The mechanism may be basically electomagnetic in its simplest form or, alternatively, embody character or code recognition devices with electrical sensors. Where multi-passenger vehicles are involved, passengers may select their destinations within the vehicle, and this requires a vehicle-borne destination memory and routing faculty. This is analogous to the system presently used for passenger lifts. For the more complex branching track layout, vehicle destination indicators would be used and the routing programmed for all vehicles as advised by the traffic control unit. In all cases feed-back is supplied by the routing changes effected in transit. For more complex systems an electronic memory becomes essential. This memory is preferably to communicate its full instructions to the traffic control unit through berth transmitters every time a vehicle comes to rest. The traffic control unit is then to rebrief the programming unit or to extend its programme, again using the berth transmitters.

In simple systems the traffic control unit controls all departures. It is the centre unit for any reasonably complex system by which individual routing faculties are to function.

At peak conditions, traffic control units are to match the flow of vehicles to the expected flow of passengers, with a more accurate subsequent matching to the tickets bought. Vehicles are to carry a means by which passengers can identify their available destination and there may or may not be a means by which passengers can communicate in order to modify or extend the programming of a vehicle on which they wish to travel. Empty vehicles are returned to the starting point by the traffic control unit and at off-peak conditions vehicles are sent by it, to zones where parking facilities are available. For any complex system the basis of the traffic control unit is likely to be a computer.

In order to eliminate excessive wiring for extensive circuits, zone control units are provided. These are short to medium range units which may control either a single junction, or a number of junctions and associated stations, and in more advanced forms they are likely to be based upon computers. Signal units as much as several miles upstream from a junction which could become a bottleneck are to inform a zone control unit of approaching concentrations of traffic. The zone control unit is then to act through signal units operating upon vehicles' speed trims in order to space out such groups before their arrival at the junction. This may involve amendment to vehicle-mounted separation controls, in order to increase the vehicle pitch whereby to make room for converging streams of vehicles. In the case of an advanced system working to full capacity, departures from upstream stations are to be coordinated with regard to the subsequent arrivals of vehicles at downstream junctions. Thus concentrations of traffic are to be spaced out. Where necessary, the zone control unit is to initiate the control of all means by which separate vehicles are integrated into contact trains.

FIG. 82 represents diagrammatically a plan of an integration station. Trains approach from the left and are routed into one or other of the two parallel siding tracks 550 or 551 by the type D track-to-vehicle signal unit 552. Berth transmitters 553 bring the trains to rest in light end-to-end contact with one another. Contact train length is related to prevailing traffic conditions and is only enough to prevent congestion on the track, i.e. the heavier the traffic the longer the contact trains which are formed, but the more rapidly they do so, so that there is very little delay. In FIG. 82 incoming vehicles are presently being directed into the siding 550 where a contact train is being formed while the contact train which was formed in the siding 551 is seen in the process of departure. A track-to-vehicle signal unit 554 (type A) causes reversion to normal guidance. The advantage of forming contact trains in this manner is that there is not usually sufficient time to form contact trains by homing moving vehicles upon one another, before the zone of congestion is reached. The system just described forms contact trains very much more rapidly and simply, and with greater precision of control. Control over departure time is another advantage.

Under conditions when congestion would otherwise take place, a stream of vehicles is momentarily to be slowed down or brought to rest, thereby establishing controlled contact forces between adjacent vehicles. This takes place in either control sections of track, or integration stations. Control sections are used to slow down the stream of vehicles, in order to bring them into contact with each other. Integration stations bring them to rest, for the same purpose. Integration stations may be lengths of track with the necessary controls, or parallel lengths, so that the stream of vehicles may be brought to rest in one, while the other is moving off. However the contact trains are formed, they subsequently move on together, maintaining end-to-end contact, and preferably maintaining contact between vehicles within prescribed limits, by means of load-sensitive devices incorporated in one or more buffers, which load-sensitive devices are provided with means to control the propulsion motors of adjacent vehicles, and thus the contact forces between adjacent vehicles. The short-term storage capacity of the integration stations themselves would enable the computers governing the zone control units to regulate departure times of contact trains so that they subsequently arrive at downstream junctions with enough space between them to permit merging without queuing. Under conditions when queuing would otherwise become necessary, the carrying capacity of the system is to be increased, under the management of zone control units, by forming longer contact trains. Because they are formed from vehicles in transit, and are normally to separate out before arrival at their final destinations, the lengths of contract trains are not restricted to platform lengths. Of course, the length of the train does not compromise the independence of routing of individual vehicles or coupled units.

Contact trains also ease the problem of merging (i.e. combining the traffic when two routes converge at a junction). This is because "separation distances" (i.e. the length of vacant track between consecutive trains or vehicles) can be more for contact trains than for individual vehicles, if the carrying capacity (i.e. the number of vehicles carried over a given length of track per unit time) is to be maintained.

According to the present invention, medium-to-long range traffic control is exercised by "zone control" computers (see above). As traffic upon the two tracks approaches the junction at which they are to merge, but still a considerable distance upstream, a medium-to-short range "merging control" becomes effective. This merging control is to be operated, through cross-connected vehicle-to-vehicle separation controls. Each train receives an "image" of the nearest converging vehicle on the other track, and spaces itself accordingly.

Special provision is required for merging, and the simplest case is secondary tracks with relatively light traffic, because these may maintain separation distances adequate to allow safe merging. After merging, individual vehicles or small contact trains will restore previously prescribed separation distances.

In more complex systems, separation distances will require to be regulated to suit individual circumstances, including prevailing traffic densities and the position of any one junction in the track system. For example, it is not necessary to re-establish such large separation distances if there are no more junctions to follow. In such cases, the separation controls of trains or individual vehicles are to be regulated by type F signal units, sited as required and normally under the control of zone control units.

On secondary tracks converging upon potentially congested primary tracks starting times of contact trains from integration stations are to be coordinated by zone control units (computers) in order to space out the arrival of individual vehicles or contact trains at each junction. Integration stations may be provided in order to form contact trains and these are normally to be on a secondary track shortly before it joins a primary line. It is through the starting times of newly formed contact trains that synchronous merging is primarily facilitated.

However, each train requires a sufficient space on the approaching track and it is not proposed to leave this to chance and waiting for such a space to arrive. Gaps between consecutive contact trains initiated by zone control units in order to facilitate merging are subsequently to be maintained by separation control until merging takes place.

Once the concept of contact trains is accepted, the resultant potential carrying capacity is so great that, in many cases, normal separation distances may be sufficient to allow safe merging of additional vehicles or trains. In any case, it would be an unrewarding complication to adjust separation distances for individual trains on simple tracks. A maximum value would there be used and this would be appropriate to the heaviest traffic conditions. Under lighter traffic conditions, the additional separation distance of this order represents a negligible increase in journey times.

However, in extreme conditions, on primary tracks the normal separation distance must be assumed to be no more than is necessary for safety. Then a specific gap must be created for each merging train. This is made possible by coordinating starting times by means of the upstream zone control unit, or units and also through type F signal units well upstream of the junctions, in order to command the space controls of individual trains or vehicles to provide the necessary separation distances. The appropriate type F signal units might be several miles upstream of the junctions. They would act through speed trims and eliminate delay in merging as long as the ultimate carrying capacity was sufficient. Under these conditions the merging control has the relatively limited function of ensuring more precise separation during the immediate approach to the junction.

The separation distance between vehicles is controlled by two systems. The first uses a master clock train of pulses which are distributed to all vehicles by distribution rails. It is normally an electrical impulse and, received by vehicles through a member resembling a power collector, it is made to time a transmission which is preferably rearwards directed from each vehicle which is in transit but not in contact with another behind it. This vehicle - originating transmission will be referred to as the C transmission. It may be ultrasonic, microwave, infra-red, or any other sort of electromagnetic or other transmission. Each moving vehicle is provided with receivers, both for the clock pulse and for the C transmission from the vehicle in front of it. The separation distance is measured from the time interval between receipt of the clock pulse and of the C transmission, and action is initiated to correct this as may be necessary by acting upon the speed trim or trims of the vehicle or contact train. In extreme cases of high velocity of approach or short separation distance, an emergency stop control may be brought into operation by this means. If the C transmission is electromagnetic, and consequently travels at the same velocity as the clock pulse, then the clock pulse travels in the reverse direction to the C transmission.

The above-mentioned system is supplemented by the obstruction detection system which will now be described with reference to FIG. 83. Rearwards directed, track-to-vehicle transmitters A and B alternate along the track, being pitched in order to provide the required safe stopping distance. Vehicles such as 560 and 561 are provided with means to detect and distinguish between signals A, B and C, and to take action if the requisite combinations of such signals are not received. The normal requirements is both A and B transmission. This ensures that the required separation distance is maintained and any obstruction, be it another vehicle or a foreign body, will cause the detecting vehicle to stop. Alternatively, coding may recognise either the dual-combination of A plus B transmissions, or a single C transmission. This allows the following vehicle such as 560 to approach more nearly to a vehicle such as 561 in motion, than to a stationary obstruction, and may be permissible for certain advanced systems. In any case, the C transmission is to be discontinued from any vehicle which is not running within a prescribed margin of its correct nominal speed and subequently any such vehicle will be detected as an obstruction.

FIG. 84 shows the vehicles 571 to 580 of a contact train separating at a branch in the track 581 according to their individual routings, i.e. branch 582 or 583. It will be seen that the front roller buffers 584 traverse the full-width buffers 585 on the back of the immediately preceding vehicle as the vehicles separate along the two respective routes 582 and 583.

For cross-connection during merging, for the transmission of A, B and C transmissions around curves and for extension of the effective range of such transmissions, signal relaying units may be track mounted as required. These may receive such transmissions and re-transmit them at increased signal volume.

In the junction arrangements of FIG. 85, relaying units at 590 to 597 are cross-connected as shown. Thus, for example, the relaying unit at 595 receives C transmissions not only from vehicles on its own track 598, but from those on the other converging track 599 also, via the relaying unit 590. Similarly, it re-transmits signals received from 590 on its own track 595. Signals received on its own track are transmitted to the relaying unit 592, and thus re-transmitted on the other track 599. In the case of electromagnetic C transmissions, the associated clock pulses are transmitted as well as the C transmissions. In such cases, the clock pulses on the converging lines 598 and 599 are substantially out of phase in order to avoid confusion. For each pair of associated cross-connections, 599 priorities are allocated by a gate device 600. This ensures, for example, that after a signal has passed from 594 to 591 then, for a given interval of time, no signal can be passed from 590 to 595. The means by which this allocates priorities is illustrated by the following example.

Consider two vehicles or trains almost abreast, say at 594 and 601. An image from that at 594 is created at 591 and the space control of that at 601 acts in response to this image, retarding the latter vehicle or train. (Note that the forward cross-connection prevents the sudden appearance of an image close enough to a vehicle on the other line to cause its emergency stop provisions to operate). Subsequently, the gate device prevents a corresponding image from 590 being transmitted to 595. Were that to happen, both vehicles would slow down, with danger of their remaining abreast.

It should also be noted that this system will create a gap for safe merging even did none exist previously. The object of the zone control unit, in creating a gap at approximately the right place, is to complete the re-spacing of vehicles on the less congested portions of track upstream of the junction.

As described, this system applies directly to the use of ultrasonic vehicle-to-vehicle signals in separation control, but it may be desired to use electromagnetic radiation of some sort, such as short-wave radio waves for this purpose. In such a case the signal speed becomes the same as that of the clock pulse. It is necessary that the clock pulse should be unidirectional and travelling in the opposite direction to consequent transmissions from vehicles. For simple systems, it may be possible to synchronise clock pulses in converging tracks, but this will not generally be possible. Thus an added feature of each gate device 600 may cause its operation to transmit both transmission C and the associated clock pulse. In this way the difference in time between the two signals is not affected by the length of cross-connecting wires and the above-mentioned difficulty is avoided.

FIG. 86 represents a typical urban distribution network. Tertiary tracks 610 penetrate the larger buildings and pass through residential areas. Vehicles travel at slow speed over them and they are provided with berth transmitters and suitable station controls to allow vehicles to stop on the lines as required to provide passenger service. Characteristically, tertiary tracks are provided to take transportation close to real and final destinations and starting points but not to carry passengers for the main part of their journey. Characteristically also, the traffic density on any one tertiary track is small, carrying capacity is relatively unimportant, and such tracks by themselves would be uneconomic. Stopping may be permitted on tertiary tracks.

Tertiary tracks communicate with secondary tracks 611, acceleration and deceleration lengths being provided. Suitable curves and provision for merging are preferably provided at most intersections. Characteristically, secondary tracks have higher nominal speeds than tertiary tracks and stopping is not permitted to take place on them. The nominal speed of any one section is related to the sharpest bend that section contains, so that there is no possibility of the queuing of vehicles or congestion taking place purely due to slowing down for curves. In general the purpose of secondary tracks is to transfer vehicles between primary tracks and tertiary tracks, and this requires tracks which have more carrying capacity than can be fully utilised, so that capacity for these tracks is still unimportant.

Primary tracks 612 are provided for the main portions of any of the shortest journeys. Speeds are higher than for secondary tracks and primary tracks do not normally directly communicate with tertiary tracks. Stations are not normally directly looped off primary trakcs. In this way the equipment necessary for merging, together with the associated acceleration and braking lengths of track are not unnecessarily proliferated. Where primary tracks meet secondary tracks, suitable acceleration and deceleration lengths are provided, and suitable curves join the two. Each primary track serves a plurality of secondary tracks and in general it is on the primary tracks that carrying capacity may ultimately become important and for which contact train formation is mainly intended. Integration stations will normally be provided before secondary tracks join primary tracks.

FIG. 87 shows a typical secondary track 611 in a suburban area through which primary tracks 612 pass or, suitably modified, at the terminal area. The pair of primary tracks 612, which respectively carry vehicles in opposite directions, have two-way connections with each end of the secondary track 611', and the secondary track serves a plurality of relatively short tertiary tracks 610'.

The above-mentioned system of three types of track is pivotal to the economics of such a system because it balances uneconomic tertiary and secondary tracks against highly economic primary tracks. Although the primary tracks are themselves economic, nevertheless they could not operate without the secondary and tertiary tracks.

Semi-automatic forms of any of the aforesaid vehicular embodiments may be provided. In these forms vehicles may be started and stopped and/or routed by a passenger or driver, who may be provided with a selector lever or a pair of selector switches, which are to cause the vehicle to branch right or branch left, as the case may be.

Interlocks and safety precautions may be illustrated by FIG. 49. At any time after passing the previous branch, the passenger selects right or left for the next branch. If he has not done so by position A, then an audible or visible warning is to remind him to do so. If he has filed to do so by position B then the manual control is made inoperative, and the vehicle follows a prearranged route (for example, a succession of left-hand branches leading to a station at which the vehicle is automatically stopped).

I claim:

1. Means of transportation comprising a mono-rail vehicle suspended from an overhead wheeled carriage by a linkage, two overhead support tracks between which the said linkage passes, which support tracks separate at a branch in the track, so that each side one thereof follows a respective side of the branch, four permanently-stationary guide surfaces, two of which extend parallel to each of said branches of the track, and vehicle-mounted followers whereby the pair of guide surfaces corresponding to the branch in the track selected may be engaged, thereby guiding the wheeled carriage into that side of the branch and whereby said wheeled carriage is temporarily supported by one only of said support tracks, and whereby two of said guide surfaces act upon two of said vehicle-mounted followers, to produce a couple which compensates for the couple produced by the asymmetrical support of the carriage.

2. Means according to claim 1, wherein said vehicle is one of a plurality of vehicles and means are provided whereby the speed of the vehicles may be controlled, and in particular reduced, to bring a group of the vehicles into end-to-end contact which is maintained during subsequent increase in speed, each vehicle having a front buffer mounting a roller and a full-width buffer at the back, across which back buffer the front of the next following vehicle slides to allow adjacent vehicle in end-to-end contact to become separated at a branch in the tracks, one branching left and one right.

3. Means according to claim 2, wherein a buffer of each vehicle is provided with a load-sensing member, whereby contact forces between adjacent vehicles are regulated to control the vehicle speed.

4. Means according to claim 1, wherein said vehicle-mounted followers cinoruse wheels which roll over said guide surfaces.

5. Means according to claim 4, wherein all four of said guide surface are effective through forces applied to said follower wheels in directions normal to the axis of rotation of said wheels at the time engaged.

6. Means according to claim 4, wherein the axis of rotation of one of said follower wheels, when the vehicle is viewed in end elevation, is disposed at an angle with respect to the axis of rotation of a support wheel of the vehicle.

7. Means according to claim 1, wherein a stop limits the motion of said follower in the direction of the load applied thereto.

8. Means of transportation according to claim 1, in which on entering said branch one of said followers is disengaged from a corresponding inward facing one of said guide surfaces, solely by reason of the component of the motion of the wheeled carriage in a direction normal to said guide surface.

9. Means according to claim 8, wherein a follower is moved into its position for engagement by the appropriate guide surfaces by motion in the same direction as the load which is subsequently applied to the follower by the guide surfaces engaged.

10. Means of transportation according to claim 1, in which two additional permanently stationary guide surfaces are provided at a branch in the track, and means are provided whereby a vehicle-mounted follower engages one or other of said additional guide surfaces on the side of the branch corresponding to the route selected.

11. Means of transportation according to claim 10, in which said vehicle-mounted follower is pivotable about a vertical axis.

12. Means of transportation according to claim 1, in which said vehicle is electrically propelled by means of power supplied through one or both of two sets of vehicle-mounted power collectors which are disengaged from their appropriate distribution rails solely by reason of a component of the motion of the wheeled carriage in a direction towards or away from the distribution rails.

13. Means of transportation comprising a plurality of mono-rail vehicles each suspended from an overhead wheeled carriage by a linkage, two overhead support tracks between which the said linkage passes, which support tracks separate at a branch in the track, so that each side one thereof follows a respective side of the branch, four permanently-stationary guide surfaces, two of which extend parallel to each of said branches of the track, vehicle-mounted followers whereby the pair of guide surfaces corresponding to the branch in the track selected may be engaged, thereby guiding the wheeled carriage into that side of the branch and whereby said wheeled carriage is temporarily supported by one only of said support tracks, and whereby two of said guide surfaces act upon two of said vehicle-mounted followers, to produce a couple which compensates for the couple produced by the asymmetrical support of the carriage, and for each vehicle means whereby the speed of the vehicles may be controlled, and in particular reduced, to bring a group of the vehicles into end-to-end contact which is maintained during subsequent increase in speed, which speed control means include speed trim means comprising a motor whose "stator" is rotatable by a second motor.

14. Means of transportation comprising a plurality of mono-rail vehicles each suspended from an overhead wheeled carriage by a linkage, two overhead support tracks between which the said linkage passes, which support tracks separate at a branch in the track, so that each side one thereof follows a respective side of the branch, four permanently-stationary guide surfaces, two of which extend prallel to each of said branches of the track, and vehicle-mounted followers whereby the pair of guide surfaces corresponding to the branch in the track selected may be engaged, thereby guiding the wheeled carriage into that side of the branch and whereby said wheeled carriage is temporarily supported by one only of said support tracks, and whereby two of said guide surfaces act upon two of said vehicle-mounted followers, to produce a couple which compensates for the couple produced by the asymmetrical support of the carriage, and means whereby the speed of the vehicles may be controlled, and in particular reduced, to bring a group of the vehicles into end-to-end contact which is maintained during subsequent increase in speed, the separation distance between vehicles being controlled by means using a clock pulse transmitted through a track-mounted conductor and receipt of the clock pulse by a vehicle initiating a rearwards transmission from that vehicle, such rearward transmission from a vehicle on one of two converging tracks being picked up by a track-mounted receiver and re-transmitted from a receiver on the other converging track.

15. Means of transportation comprising a mono-rail vehicle suspended from an overhead wheeled carriage by a linkage, a hollow beam within which said wheeled carriage runs and which provides two overhead support tracks between which the said linkage passes which support tracks separate at a branch in the tracks, so that each side one thereof follows a respective side of the branch, four permanently-stationary guide surfaces, two of which extend parallel to each of said branches of the track and are each provided by a member projecting downwards from the inside of the top of said beam, and vehicle-mounted followers whereby the pair of guide surfaces corresponding to the branch in the track selected may be engaged, thereby guiding the wheeled carriage into that side of the branch and whereby said wheeled carriage is temporarily supported by one only of said support tracks, and whereby two of said guide surfaces act upon two of said vehicle-mounted followers, to produce a couple which compensates for the couple produced by the asymmetrical support of the carriage.

16. Means according to claim 14, wherein the associated clock pulse is also similarly picked up and re-transmitted.

17. Means according to claim 16, wherein said clock pulses on two converging tracks are substantially out of phase.

18. Means of transportation according to claim 15, in which said downward-projecting guide surfaces are provided only at selected portions of said tracks.

19. Means of transportation according to claim 18, in which said downward-projecting guide surfaces are alternatively engageable by the same follower assembly incorporating one of said followers.

20. Means of transportation according to claim 19, in which said follower assembly is provided with means for pivoting about an axis parallel to the plane of said guide surface at the time engaged by the follower of the assembly.

21. Means of transportation according to claim 15, in which said vehicle is driven by a linear motor at the top of all parts of the wheeled carriage except a follower assembly at the time engaged with one of said downward-projecting guide surfaces.

\* \* \* \* \*